(12) United States Patent
Keefe et al.

(10) Patent No.: US 6,273,560 B1
(45) Date of Patent: *Aug. 14, 2001

(54) PRINT CARTRIDGE COUPLING AND RESERVOIR ASSEMBLY FOR USE IN AN INKJET PRINTING SYSTEM WITH AN OFF-AXIS INK SUPPLY

(75) Inventors: Brian J. Keefe, La Jolla, CA (US); Norman E. Pawlowski, Jr., Corvallis, OR (US); Michael E. Peterschmidt, Albany, OR (US); Carrie E. Harris, Corvallis, OR (US); Winthrop D. Childers, San Diego, CA (US); James P. Kearns, Corvallis; Jeffrey D. Langford, Lebanon, both of OR (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/742,253

(22) Filed: Oct. 31, 1996

Related U.S. Application Data

(63) Continuation-in-part of application No. 08/706,121, filed on Aug. 30, 1996, now Pat. No. 5,966,155, which is a continuation-in-part of application No. 08/550,902, filed on Oct. 31, 1995, now Pat. No. 5,872,584, which is a continuation-in-part of application No. 08/518,847, filed on Aug. 24, 1995, now Pat. No. 5,736,992, which is a continuation-in-part of application No. 08/331,453, filed on Oct. 31, 1994, now Pat. No. 5,583,545.

(51) Int. Cl.[7] .................................................... B41J 2/175

(52) U.S. Cl. ................................................................ 347/86

(58) Field of Search ................................. 347/84, 85, 86, 347/87

(56) References Cited

U.S. PATENT DOCUMENTS 4,368,478 * 1/1983 Koto ........................................ 347/86

(List continued on next page.)

FOREIGN PATENT DOCUMENTS

| A0339770 | 2/1989 | (EP) . |
|---|---|---|
| 0604940 A1 | 7/1994 | (EP) . |
| 0756937 A2 | 2/1997 | (EP) . |
| 0794058 A2 | 9/1997 | (EP) . |
| 0799702 A1 | 10/1997 | (EP) . |
| 2298616 A | 9/1996 | (GB) . |
| 62271750 | 11/1987 | (JP) . |

OTHER PUBLICATIONS

EP Search Report for EP 97 30 8715 dated Feb. 25, 1998.

*Primary Examiner*—N. Le
*Assistant Examiner*—Anh T. N. Vo
(74) *Attorney, Agent, or Firm*—Dennis G. Stenstrom

(57) ABSTRACT

Disclosed is a fluidic coupling that releasably and fluidically connects to the inlet port of an inkjet print cartridge. The fluidic coupling acts as a seal for the print cartridge and a means of lubricating and protecting the inlet port from drying, leaking ink, and air ingestion while the print cartridge is in transit and in storage. The fluidic coupling also provides an auxiliary ink reservoir for the print cartridge. The fluidic coupling further provides an ink conduit to the printhead from an external ink supply. First first and second end portions define an internal chamber, the internal chamber providing an internal fluid conduit for ink between the first and second ends of the body; and a fluidic coupling affixed to the first end of the body and in fluidic communication with the internal chamber. Optionally, there is a second fluidic coupling affixed to the second end of the body adapted to releasably seal to an outlet port of an ink supply to allow fluid communication between internal fluid conduit and the outlet port of the ink supply so as to allow ink flow from the ink supply through the second fluidic coupling, and into the internal fluid conduit.

28 Claims, 25 Drawing Sheets

U.S. PATENT DOCUMENTS

| | | | |
|---|---|---|---|
| 4,429,320 | 1/1984 | Hattori et al. | 347/86 |
| 4,460,905 | 7/1984 | Thomas | 347/54 |
| 4,496,959 | 1/1985 | Frerichs | 347/86 |
| 4,506,276 | 3/1985 | Kyser et al. | 347/86 |
| 4,509,062 | 4/1985 | Low et al. | 347/87 |
| 4,558,326 | 12/1985 | Kimura et al. | 347/30 |
| 4,628,332 | 12/1986 | Matsumoto | 347/49 |
| 4,677,447 | 6/1987 | Nielsen | 347/87 |
| 4,804,944 | 2/1989 | Golladay et al. | 340/624 |
| 4,831,389 * | 5/1989 | Chan | 347/86 |
| 4,914,453 | 4/1990 | Kanayama et al. | 347/86 |
| 4,929,109 * | 5/1990 | Ikenaga | 347/86 |
| 4,940,997 | 7/1990 | Hamlin et al. | 347/87 |
| 4,992,802 | 2/1991 | Thomas et al. | 347/87 |
| 5,079,570 | 1/1992 | Mohr | 347/7 |
| 5,315,317 | 5/1994 | Terasawa et al. | 347/7 |
| 5,325,119 | 6/1994 | Fong | 347/86 |
| 5,367,328 | 11/1994 | Erickson | 347/7 |
| 5,369,429 | 11/1994 | Erickson | 347/7 |
| 5,469,201 * | 11/1995 | Erickson et al. | 347/85 |
| 5,506,611 | 4/1996 | Ujita et al. | 347/86 |
| 5,552,815 | 9/1996 | Shimoda | 347/85 |
| 5,574,489 | 11/1996 | Cowger et al. | 347/86 |
| 5,619,239 | 4/1997 | Kotaki et al. | 347/86 |
| 5,621,445 * | 4/1997 | Fong et al. | 347/87 |
| 5,719,609 | 2/1998 | Hauck et al. | 347/85 |
| 5,757,390 * | 5/1998 | Gragg et al. | 347/7 |
| 5,767,882 * | 6/1998 | Kaplinsky et al. | 347/87 |
| 5,835,111 | 11/1998 | Balazer | 347/50 |

* cited by examiner

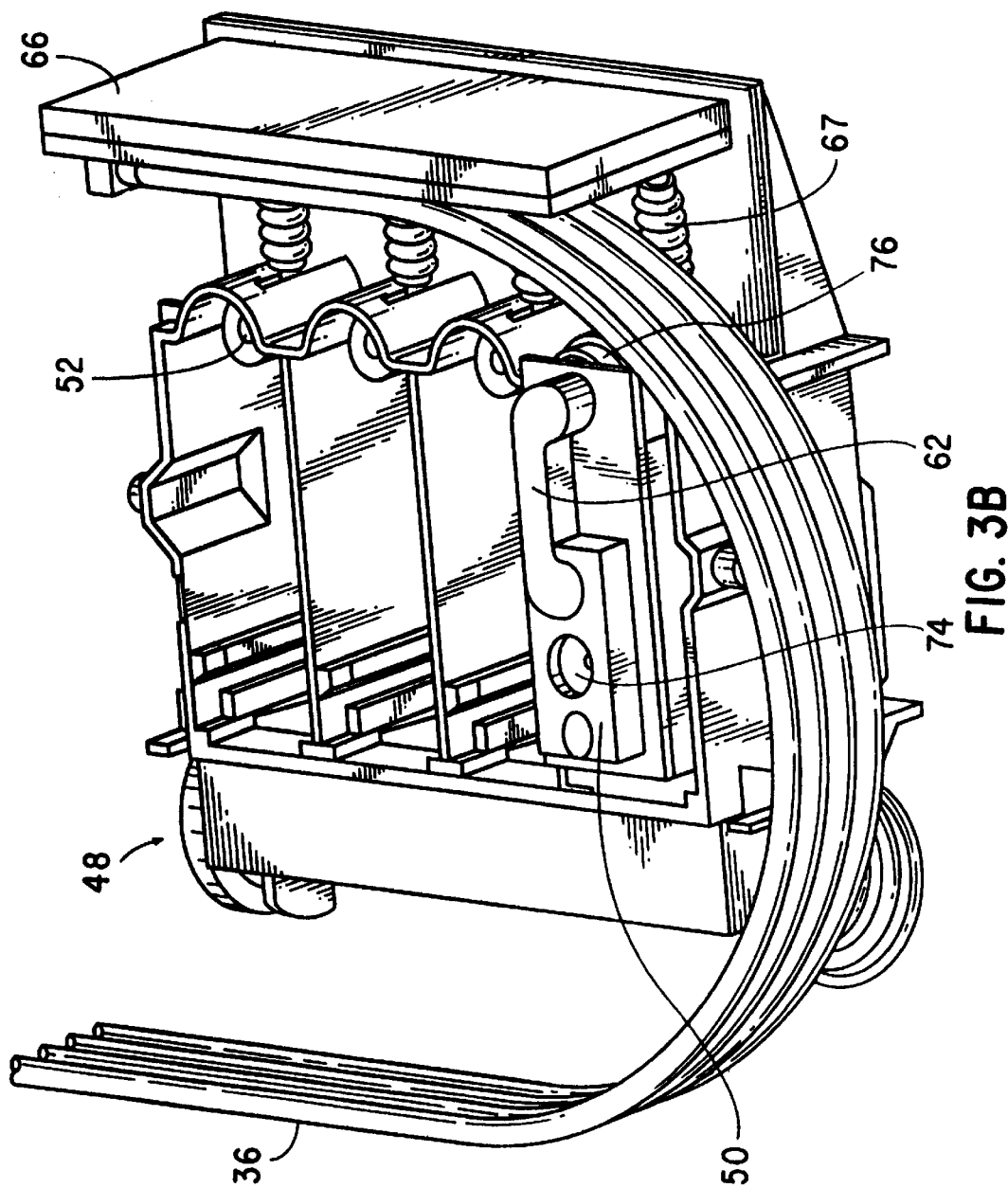

PRINT CARTRIDGE COUPLING AND RESERVOIR ASSEMBLY FOR USE IN AN INKJET PRINTING SYSTEM WITH AN OFF-AXIS INK SUPPLY

CROSS-REFERENCE TO RELATED APPLICATIONS

This application is a continuation-in-part of U.S. patent application Ser. No. 08/706,121, filed Aug. 30, 1996, now U.S. Pat. No. 5,966,155 entitled "Inkjet Printing System with Off-Axis Ink Supply Having Ink Path Which Does Not Extend above Print Cartridge" by Norman Pawlowski, Jr. et al., which is a continuation-in-part of U.S. patent application Ser. No. 08/550,902, filed Oct. 31, 1995, entitled "Apparatus for Providing Ink to an Ink-Jet Print Head and for Compensating for Entrapped Air" by Norman Pawlowski, Jr. et al., now U.S. Pat. No. 5,872,584, which is a continuation-in-part of U.S. patent application Ser. No. 08/518,847, filed Aug. 24, 1995, entitled "Pressure Regulated Free-Ink-Jet Pen," by Norman Pawlowski, Jr. et al., now U.S. Pat. No. 5,736,992, which is a continuation-in-part of U.S. patent application Ser. No. 08/331,453, filed Oct. 31, 1994, by Norman Pawlowski, Jr. et al., now U.S. Pat. No. 5,583,545. The foregoing patents and patent applications are herein incorporated by reference.

FIELD OF THE INVENTION

This invention relates to inkjet printers and, more particularly, to an inkjet printer having a scanning printhead with a stationary Ink supply.

BACKGROUND OF THE INVENTION

Thermal inkjet hardcopy devices such as printers, graphics plotters, facsimile machines and copiers have gained wide acceptance. These hardcopy devices are described by W. J. Lloyd and H. T. Taub in "Ink Jet Devices," Chapter 13 of *Output Hardcopy Devices* (Ed. R. C. Durbeck and S. Sherr, San Diego: Academic Press, 1988) and U.S. Pat. Nos. 4,490,728 and 4,313,684. The basics of this technology are further disclosed in various articles in several editions of the *Hewlett-Packard Journal* [Vol. 36, No. 5 (May 1985), Vol. 39, No. 4 (August 1988), Vol. 39, No. 5 (October 1988), Vol. 43, No. 4 (August 1992), Vol. 43, No. 6 (December 1992) and Vol. 45, No. 1 (February 1994)], incorporated herein by reference. Inkjet hardcopy devices produce high quality print, are compact and portable, and print quickly and quietly because only Ink strikes the paper.

An inkjet printer forms a printed image by printing a pattern of individual dots at particular locations of an array defined for the printing medium. The locations are conveniently visualized as being small dots in a rectilinear array. The locations are sometimes "dot locations", "dot positions", or pixels". Thus, the printing operation can be viewed as the filling of a pattern of dot locations with dots of Ink.

Inkjet hardcopy devices print dots by ejecting very small drops of Ink onto the print medium and typically include a movable carriage that supports one or more printheads each having Ink ejecting nozzles. The carriage traverses over the surface of the print medium, and the nozzles are controlled to eject drops of Ink at appropriate times pursuant to command of a microcomputer or other controller, wherein the timing of the application of the Ink drops is intended to correspond to the pattern of pixels of the image being printed.

The typical inkjet printhead (i.e., the silicon substrate, structures built on the substrate, and connections to the substrate) uses liquid Ink (i.e., dissolved colorants or pigments dispersed in a solvent). It has an array of precisely formed orifices or nozzles attached to a printhead substrate that incorporates an array of Ink ejection chambers which receive liquid Ink from the Ink reservoir. Each chamber is located opposite the nozzle so Ink can collect between it and the nozzle. The ejection of Ink droplets is typically under the control of a microprocessor, the signals of which are conveyed by electrical traces to the resistor elements. When electric printing pulses heat the inkjet firing chamber resistor, a small portion of the Ink next to it vaporizes and ejects a drop of Ink from the printhead. Properly arranged nozzles form a dot matrix pattern. Properly sequencing the operation of each nozzle causes characters or images to be printed upon the paper as the printhead moves past the paper.

The Ink cartridge containing the nozzles is moved repeatedly across the width of the medium to be printed upon. At each of a designated number of increments of this movement across the medium, each of the nozzles is caused either to eject Ink or to refrain from ejecting Ink according to the program output of the controlling microprocessor. Each completed movement across the medium can print a swath approximately as wide as the number of nozzles arranged in a column of the Ink cartridge multiplied times the distance between nozzle centers. After each such completed movement or swath the medium is moved forward the width of the swath, and the Ink cartridge begins the next swath. By proper selection and timing of the signals, the desired print is obtained on the medium.

Color inkjet hardcopy devices commonly employ a plurality of print cartridges, usually either two or four, mounted in the printer carriage to produce a full spectrum of colors. In a printer with four cartridges, each print cartridge contains a different color Ink, with the commonly used base colors being cyan, magenta, yellow, and black. In a printer with two cartridges, one cartridge usually contains black Ink with the other cartridge being a tri-compartment cartridge containing the base color cyan, magenta and yellow inks. The base colors are produced on the media by depositing a drop of the required color onto a dot location, while secondary or shaded colors are formed by depositing multiple drops of different base color inks onto the same dot location, with the overprinting of two or more base colors producing the secondary colors according to well established optical principles.

For many applications, such as personal computer printers and fax machines, the Ink reservoir has been incorporated into the pen body such that when the pen runs out of Ink, the entire pen, including the printhead, is replaced.

However, for other hardcopy applications, such as large format plotting of engineering drawings, color posters and the like, there is a requirement for the use of much larger volumes of Ink than can be contained within the replaceable pens. Therefore, various off-board Ink reservoir systems have been developed recently which provide an external stationary Ink supply connected to the scanning cartridge via a tube. The external Ink supply is typically known as an "off-axis," "off-board," or "off-carriage" Ink supply. While providing increased Ink capacity, these off-carriage systems also present a number of problems. The space requirements for the off-carriage reservoirs and tubing impact the size of the printer, with consequent cost increase.

These various problems include undesirable fluctuations in Ink pressure in the print cartridge, an unreliable and complex fluid seal between the print cartridge and the external Ink supply, increased printer size due to the external Ink supply's connection to the print cartridge, blockage in the Ink delivery system, air accumulation in the tubes leading to the print cartridge, leakage of Ink, high cost, and complexity.

More importantly, the new off-axis design print cartridges have very little internal Ink capacity in their reservoirs. Each time a new cartridge is manufactured, it needs to be run through an automated print quality tester (APQT). This allows the manufacturer to screen out cartridges failing to meet minimum quality standards. This testing requires the use of Ink. Additional production line processes that use Ink may include a nozzle down flush, wetfiring, and reprinting. With the new off-axis cartridge designs, the amount of Ink available internally may not be enough to make it through the APQT test and other uses of Ink.

Prior to printer installation, the cartridge is in transit and in storage. Therefore, there is also a need to provide a means of lubricating and protecting the inlet port. In particular, the port should be protected from drying, leaking Ink, and air ingestion.

What is needed is an fluidic coupling that releasably and fluidically connects to the inlet port of a print cartridge for Ink replenishment so as to provide a print cartridge seal from the outside atmosphere, compliance, and an auxiliary Ink source for the print cartridge.

SUMMARY

The present invention provides fluidic coupling that releasably and fluidically connects to the inlet port of a print cartridge. The fluidic coupling acts as a seal for the print cartridge and a means of lubricating and protecting the inlet port from drying, leaking Ink, and air ingestion while the print cartridge is in transit and in storage. The fluidic coupling also provides an auxiliary Ink reservoir for the print cartridge. The fluidic coupling further provides an Ink conduit to the printhead from an external Ink supply.

The fluidic adapter of the present invention is advantageously utilized in an inkjet printer which includes a replaceable print cartridge which is inserted into a scanning carriage. A fluid interconnect on the print cartridge connects to a fluid interconnect on the carriage when the print cartridge is inserted into the carriage to complete the fluid connection between the external Ink supply and the print cartridge. The fluid interconnection is made between the print cartridge and the Ink tube simply by placing the print cartridge into a stall in the scanning carriage. A pressure regulator, which may be internal or external to the print cartridge, regulates the flow of Ink from the external Ink supply to the print cartridge. The external Ink supply may be pressurized or non-pressurized.

The present invention is a printing system having a print cartridge having a printhead for ejecting Ink on media in an ejection direction, the print cartridge having an Ink inlet port oriented to allows fluid flow in a direction substantially opposite to the ejection direction, including a scanning carriage for supporting the print cartridge and scanning across the media; a fluid coupling adapted to fluidically couple with the inlet port such that Ink can flow from the fluid coupling in a direction that is substantially opposite to the ejection direction; a fluid conduit that is in fluid communication with the fluid coupling, the fluid conduit receives Ink from an Ink source; and an Ink source.

The invention also includes a fluidic adapter for an Ink jet print cartridge having nozzles for ejecting Ink in an ejection direction and having an Ink inlet port oriented to receive Ink in a direction substantially opposite to the droplet ejecting direction, which includes a body having an outer shell and first and second end portions defining an internal chamber, the internal chamber providing an internal fluid conduit for Ink between the first and second ends of the body; and a fluidic coupling affixed to the first end of the body and in fluidic communication with the internal chamber. Optionally, there is a second fluidic coupling affixed to the second end of the body and in fluidic communication with the internal chamber; the first fluidic coupling adapted to releasably seal to the inlet port of the print cartridge to allow fluid communication between internal fluid conduit and the inlet port of the print cartridge so as to allow Ink flow through the fluid conduit to the first fluidic coupling, through the first fluidic coupling and into the inlet port of the print cartridge in a direction substantially opposite to the droplet ejection direction; and the second fluidic coupling adapted to releasably seal to an outlet port of an Ink supply to allow fluid communication between internal fluid conduit and the outlet port of the Ink supply so as to allow Ink flow from the Ink supply through the second fluidic coupling, and into the internal fluid conduit.

BRIEF DESCRIPTION OF THE DRAWINGS

FIG. 3B is a perspective view looking down on a carriage with one print cartridge installed.

DETAILED DESCRIPTION OF THE PREFERRED EMBODIMENTS

Figure 1A:
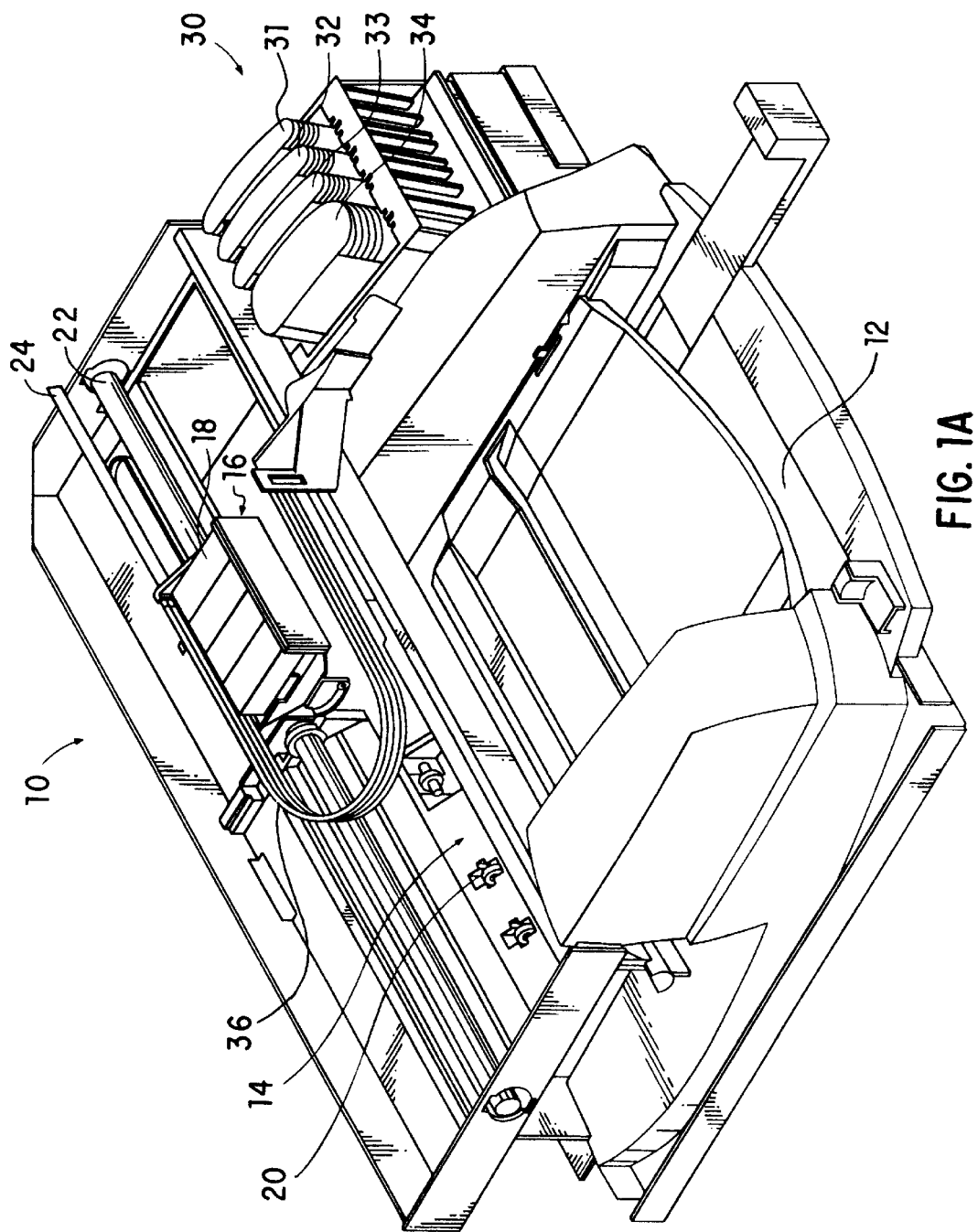
FIG. 1A is a perspective view of one embodiment of an inkjet printer incorporating the present invention.

FIG. 1A is a perspective view of one embodiment of an inkjet printer 10, with its cover removed, incorporating various inventive features. Generally, printer 10 includes a tray 12 for holding virgin paper. When a printing operation is initiated, a sheet of paper from tray 12 is fed into printer 10 using a sheet feeder, then brought around in a U direction to now travel in the opposite direction toward tray 12. The sheet is stopped in a print zone 14, and a scanning carriage 16, containing one or more print cartridges 18, is then scanned across the sheet for printing a swath of Ink thereon.

After a single scan or multiple scans, the sheet is then incrementally shifted using a conventional stepper motor and feed rollers 20 to a next position within print zone 14, and carriage 16 again scans across the sheet for printing a next swath of Ink. When the printing on the sheet is complete, the sheet is forwarded to a position above tray 12, held in that position to ensure the Ink is dry, and then released.

Alternative embodiment printers include those with an output tray located at the back of printer 10, where the sheet of paper is fed through the print zone 14 without being fed back in a U direction.

The carriage 16 scanning mechanism may be conventional and generally includes a slide rod 22, along which carriage 16 slides, and a coded strip 24 which is optically detected by a photodetector in carriage 16 for precisely positioning carriage 16. A stepper motor (not shown), connected to carriage 16 using a conventional drive belt and pulley arrangement, is used for transporting carriage 16 across print zone 14.

The novel features of inkjet printer 10 and the other inkjet printers described in this specification relate to the Ink delivery system for providing Ink to the print cartridges 18 and ultimately to the Ink ejection chambers in the printheads. This Ink delivery system includes an off-axis Ink supply station 30 containing replaceable Ink supply cartridges 31, 32, 33, and 34, which may be pressurized or at atmospheric pressure. For color printers, there will typically be a separate Ink supply cartridge for black Ink, yellow Ink, magenta Ink, and cyan Ink.

Four tubes 36 carry Ink from the four replaceable Ink supply cartridges 31–34 to the four print cartridges 18.

Various embodiments of the off-axis Ink supply, scanning carriage, and print cartridges will be described herein.

Figure 1B:
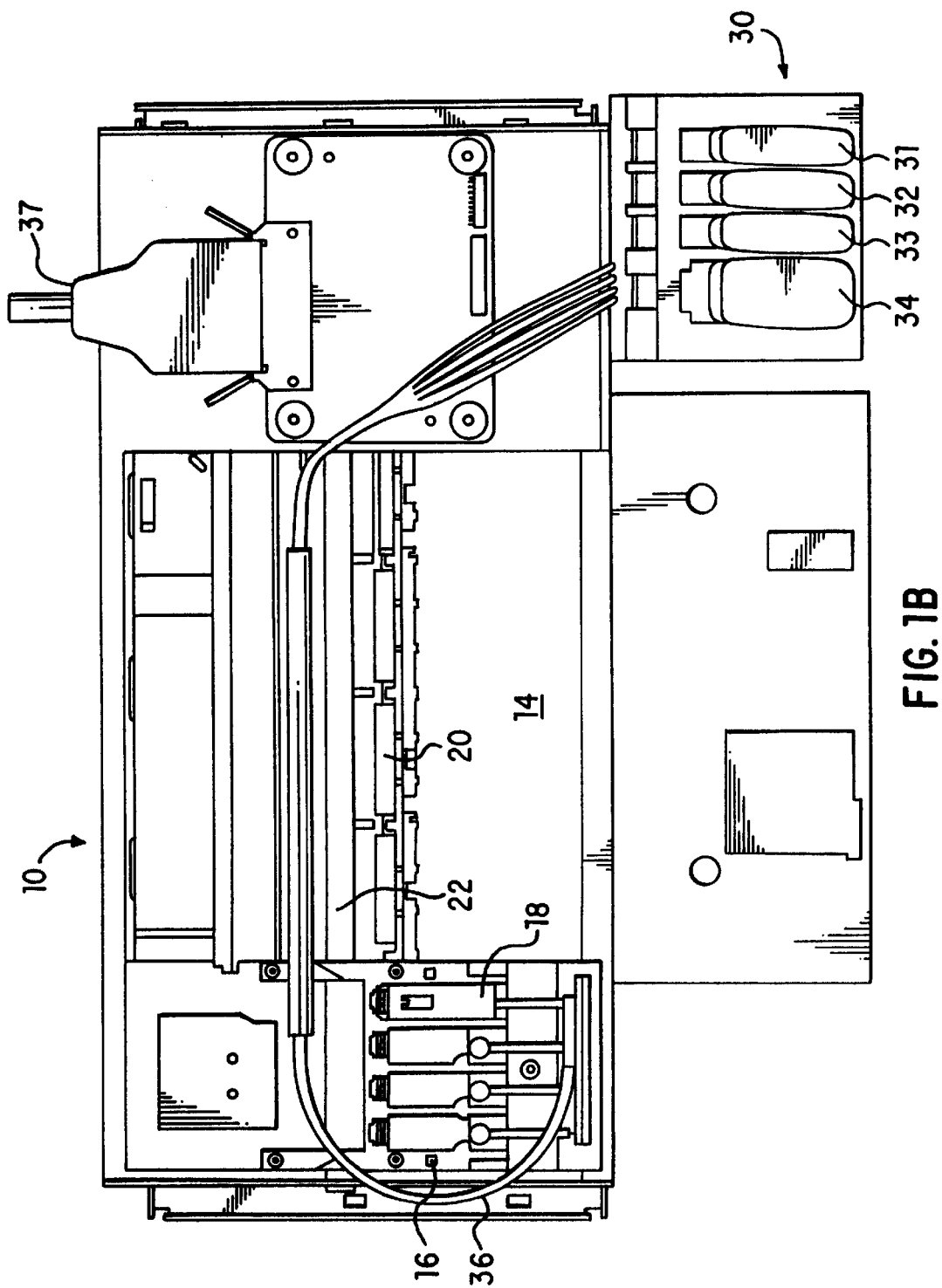
FIG. 1B is a top down view of another inkjet printer incorporating the present invention.

FIG. 1B is a top down view of another printer 10 very similar to that shown in FIG. 1A, but with the paper tray removed. An electrical connector 37 is shown connected between printer 10 and a personal computer. Elements throughout the various figures identified with the same numerals may be identical.

Figure 2:
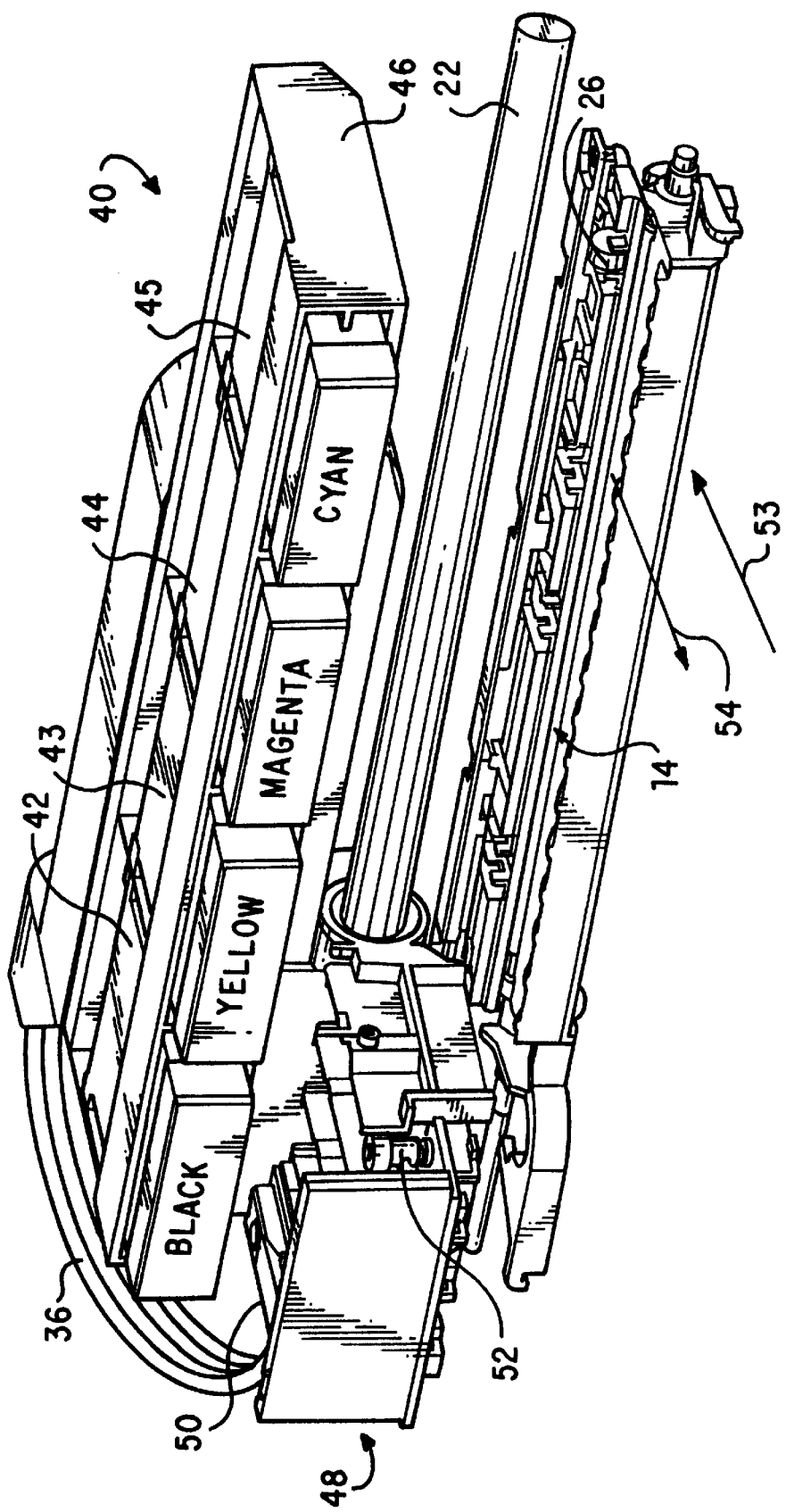
FIG. 2 is a perspective view of the Ink delivery system and carriage of another embodiment inkjet printer incorporating the present invention.

FIG. 2 illustrates the Ink delivery system of an alternative embodiment printer 40. In this embodiment, four replaceable Ink supply cartridges 42–45 are shown installed in a fixed station 46 above a scanning carriage 48. This particular location of station 46 and the horizontal arrangement of Ink supply cartridges 42–45 results in an efficient utilization of available space within printer 40. In another embodiment, station 46 may be located virtually anywhere within printer 40.

A single print cartridge 50 is shown installed in carriage 48. Four tubes 36, each connected to an Ink supply cartridge 42–45, are in fluid connection with a rubber septum 52 for each of the four stalls in carriage 48. A hollow needle 60 (FIG. 3A) formed as part of each print cartridge 50 is inserted through the rubber septum 52 upon pushing the print cartridge 50 into its associated stall within carriage 48 so that a fluid communication path exists between a particular Ink supply cartridge 42–45 and a particular print cartridge 50 for providing a supply of Ink to the print cartridge 50.

A sheet of paper enters through the bottom portion of printer 40 in the direction of arrow 53, then guided back in a U direction, and transported through the print zone 14 in the direction of arrow 54. Carriage 48 then scans across print zone 14 for printing on the sheet. In another embodiment, a sheet of paper enters the print zone 14 in the direction of arrow 53.

Figure 3A:
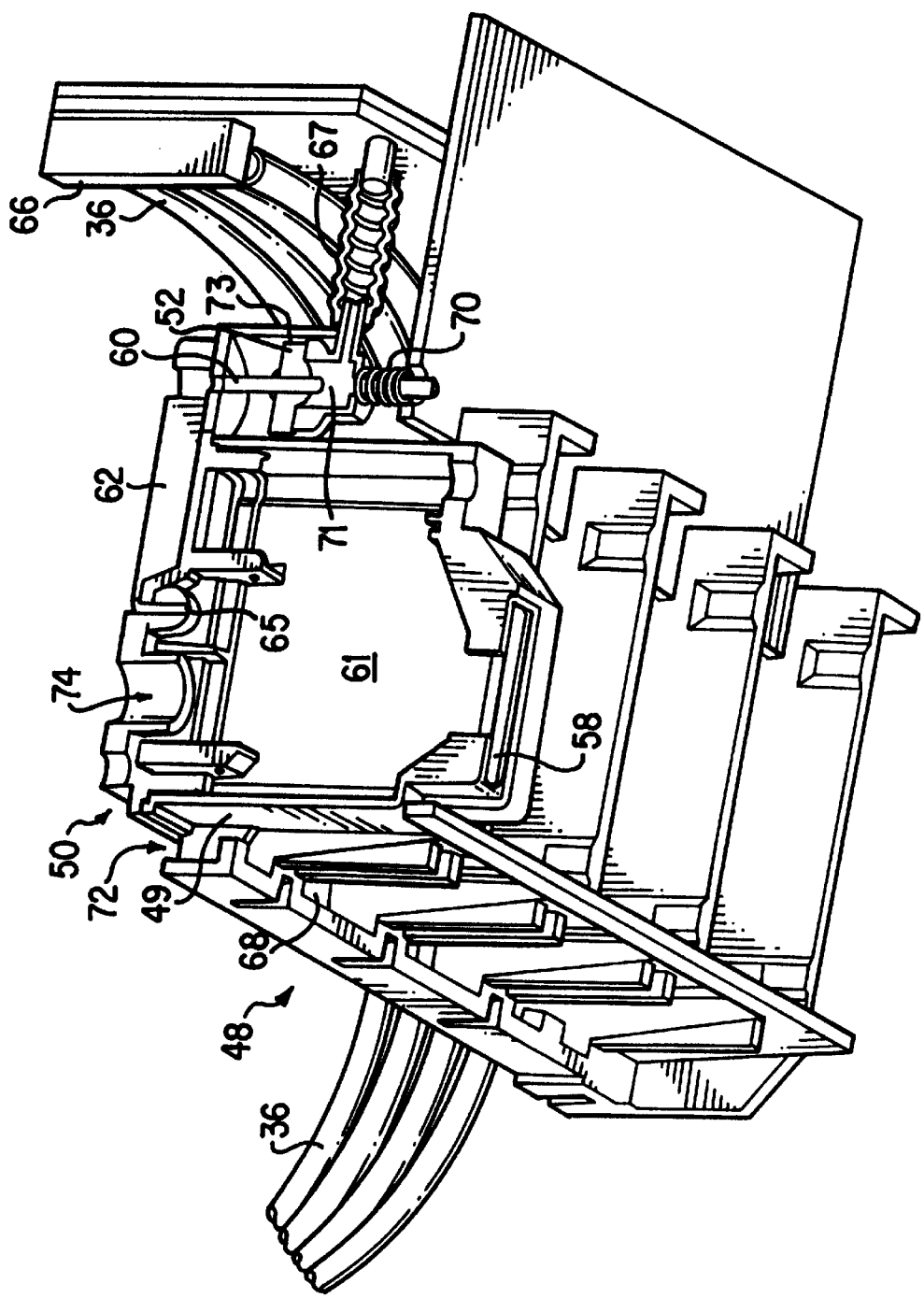
FIG. 3A illustrates the preferred carriage with one embodiment of the print cartridge in cross-section.

FIG. 3A is a perspective view looking up at carriage 48, showing print cartridge 50 and septum 52 in cross-section. This cross-section does not show a regulator valve within print cartridge 50 that regulates pressure by opening and closing hole 65. An opening in the bottom of carriage 48 exposes the printhead location 58 of each print cartridge 50. Carriage electrodes 49 oppose contact pads located on print cartridge 50.

When the aforementioned regulator valve is opened, a hollow needle 60 is in fluid communication with an Ink chamber 61 internal to print cartridge 50. The hollow needle 60 extends through a self-sealing slit formed through the center of septum 52. This self-sealing slit is automatically sealed by the resiliency of the rubber septum 52 when needle 60 is removed.

A plastic Ink conduit 62 leads from needle 60 to Ink chamber 61 via hole 65. Conduit 62 may also be integral to the print cartridge body. Conduit 62 may be glued, heat-staked, ultrasonically welded, or otherwise secured to the print cartridge body.

Ink is provided to carriage 48 by tubes 36 which connect to a plastic manifold 66. Tubes 36 may be formed of Polyvinylidene Chloride (PVDC), such as Saran™, or other suitable plastic. Tubes 36 may also be formed of a very flexible polymer material and dipped in PVDC for reducing air diffusion through the tubes. In the preferred embodiment, non-pressurized Ink tubes 36 have an internal diameter between approximately 1.5–2.5 mm, while pressurized Ink tubes 36 have an internal diameter between approximately 1–1.5 mm. Manifold 66 provides several 90° redirections of Ink flow. Such a manifold 66 may not be needed if tubes 36 are sufficiently slender and can be bent without buckling. A pressurized off-axis Ink supply (described later) may utilize such slender tubing. An alternative to manifold 66 is a series of elbows molded or formed out of heat formed tubing.

A septum elbow 71 routes Ink from manifold 66 to septum 52 and supports septum 52. Septum 52 is affixed to elbow 71 using a crimp cap 73.

A bellows 67 (shown in cross-section) is provided for each of the individual stalls 68 for allowing a degree of x, y, and z movement of septum 52 when needle 60 is inserted into septum 52 to minimize the x, y, and z load on needle 60 and ensure a fluid-tight and air-tight seal around needle 60. Bellows 67 may be formed of butyl rubber, high acn nitrile, or other flexible material with low vapor and air transmission properties. Bellow 67 can be any length and can even be a flexible diaphram.

A spring 70 urges septum 52 upward. This allows septum 52 to take up z tolerances, minimizes the load on needle 60, and ensures a tight seal around needle 60.

Slots 72 formed on each of the stalls 68 in carriage 48 align with tabs on each print cartridge 50 to restrict movement of the print cartridge 50 within the stall 68.

An air vent 74 formed in the top of print cartridge 50 is used by a pressure regulator in print cartridge 50, to be described later. In an alternative embodiment, a separate regulator may be connected between the off-axis Ink supply and each print cartridge 50.

FIG. 3B is a perspective view of carriage 48 looking down on carriage 48 and showing one print cartridge 50 installed.

In other embodiments, shown in FIGS. 3C–3F, bellows 67 is replaced with a U-shaped, circular, or straight flexible tube.

Figure 3C:
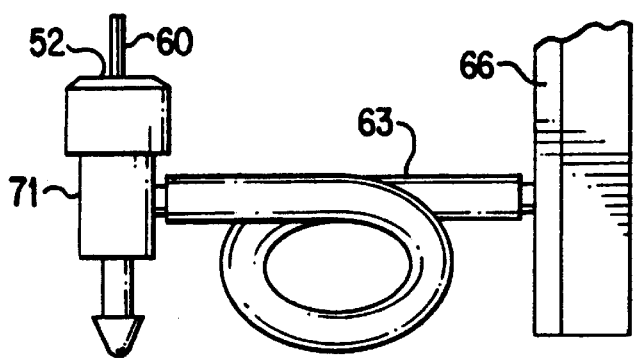
FIG. 3C illustrates the use of a flexible tube connected to a rigid elbow member and to a manifold.

FIG. 3C illustrates a circular flexible tube 63 connected between elbow 71 and manifold 66.

Figure 3D:
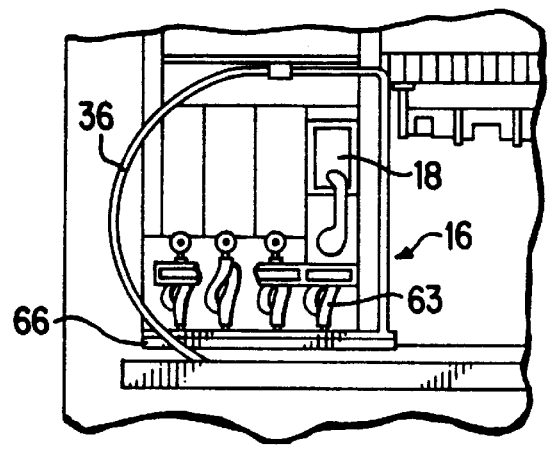
FIG. 3D is a top down view of a carriage incorporating the flexible tube of FIG. 3C.

FIG. 3D is a top down view of the carriage 16 incorporating tube 63.

Figure 3E:
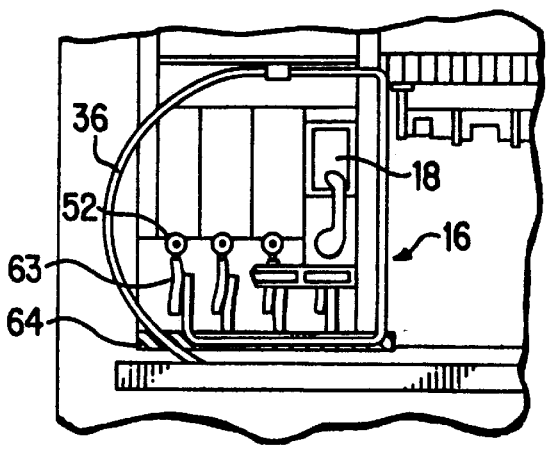
FIG. 3E is a top down view of a carriage without a manifold and incorporating a flexible tube connected to a rigid elbow member.

In another embodiment, shown in FIG. 3E, manifold 66 is deleted, and tubes 63 are connected to (or are part of) tube 36. A plastic guide 64 may be used to guide the tubes 63.

Figure 3F:
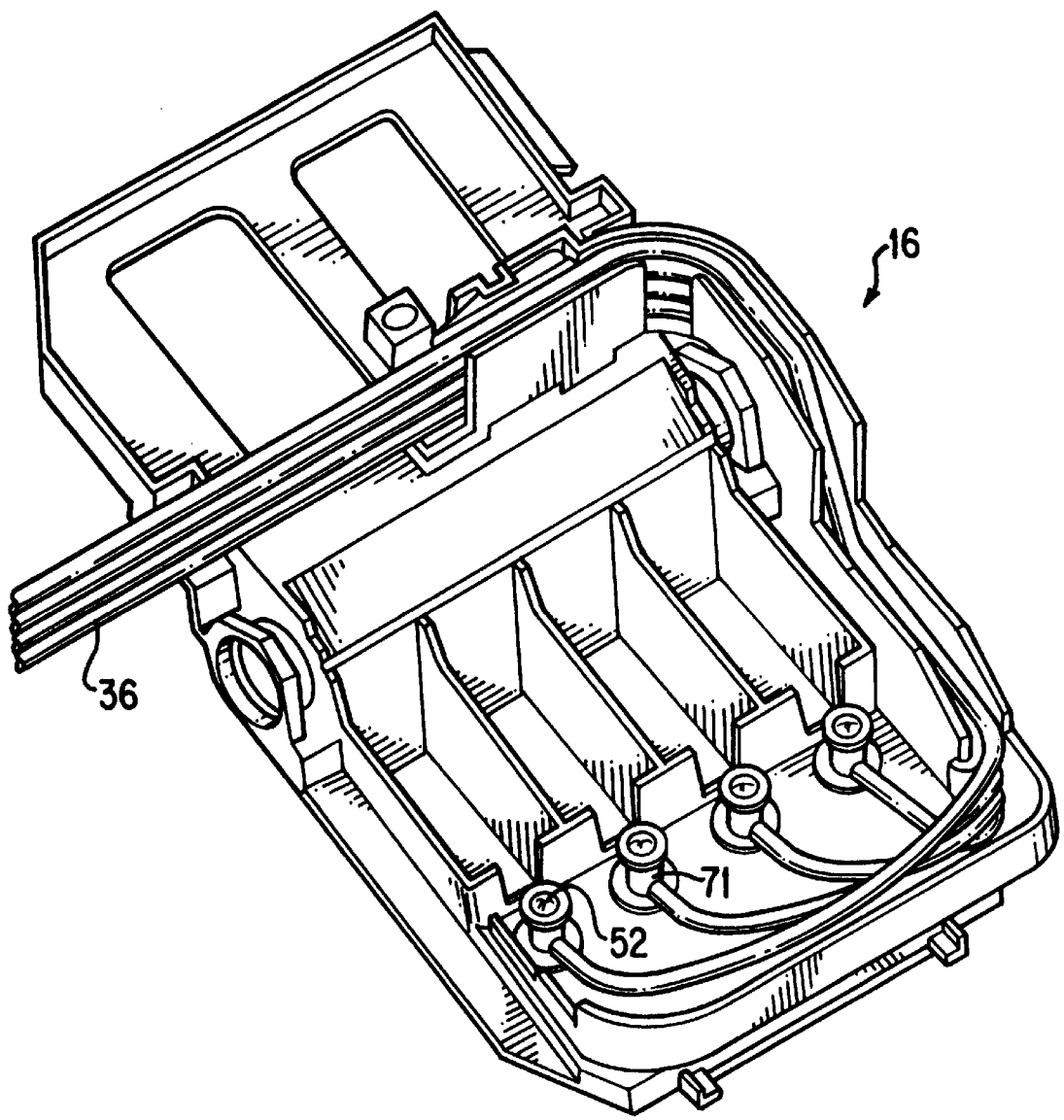
FIG. 3F is a perspective view of a carriage without a manifold and incorporating a flexible tube connected to a rigid elbow member.

In FIG. 3F, the tubes 36 are directly connected to the rigid plastic elbow 71 supporting septum 52 without being coiled.

If desired, the print cartridges can be secured within the scanning carriage by individual latches, which may be manually operated or spring loaded, where the latches press down on a tab or a corner of the print cartridge. In another embodiment, a single latch, such as a hinged bar, secures all four print cartridges in place within the carriage.

Figure 4:
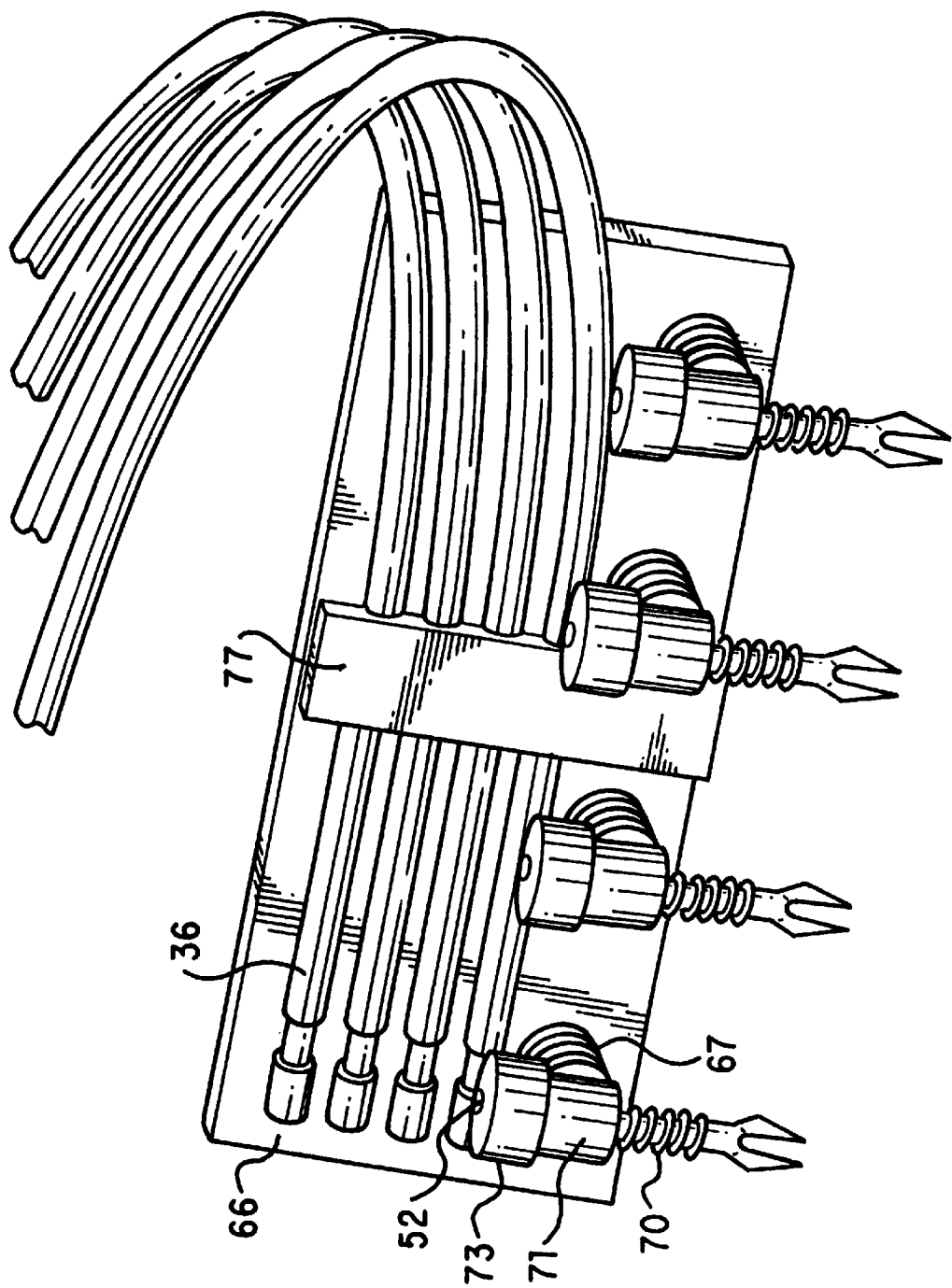
FIG. 4 is a detailed view of the interface between the flexible tubes connected to the external Ink supply and the fluid interconnect located on the carriage.

FIG. 4 is a detailed view of manifold 66, tubes 36, crimp cap 73, septum 52, septum elbow 71, spring 70, and bellows 67 described with respect to FIG. 3A. A stress reliever 77 for tubes 36 is also shown.

Figure 5A:
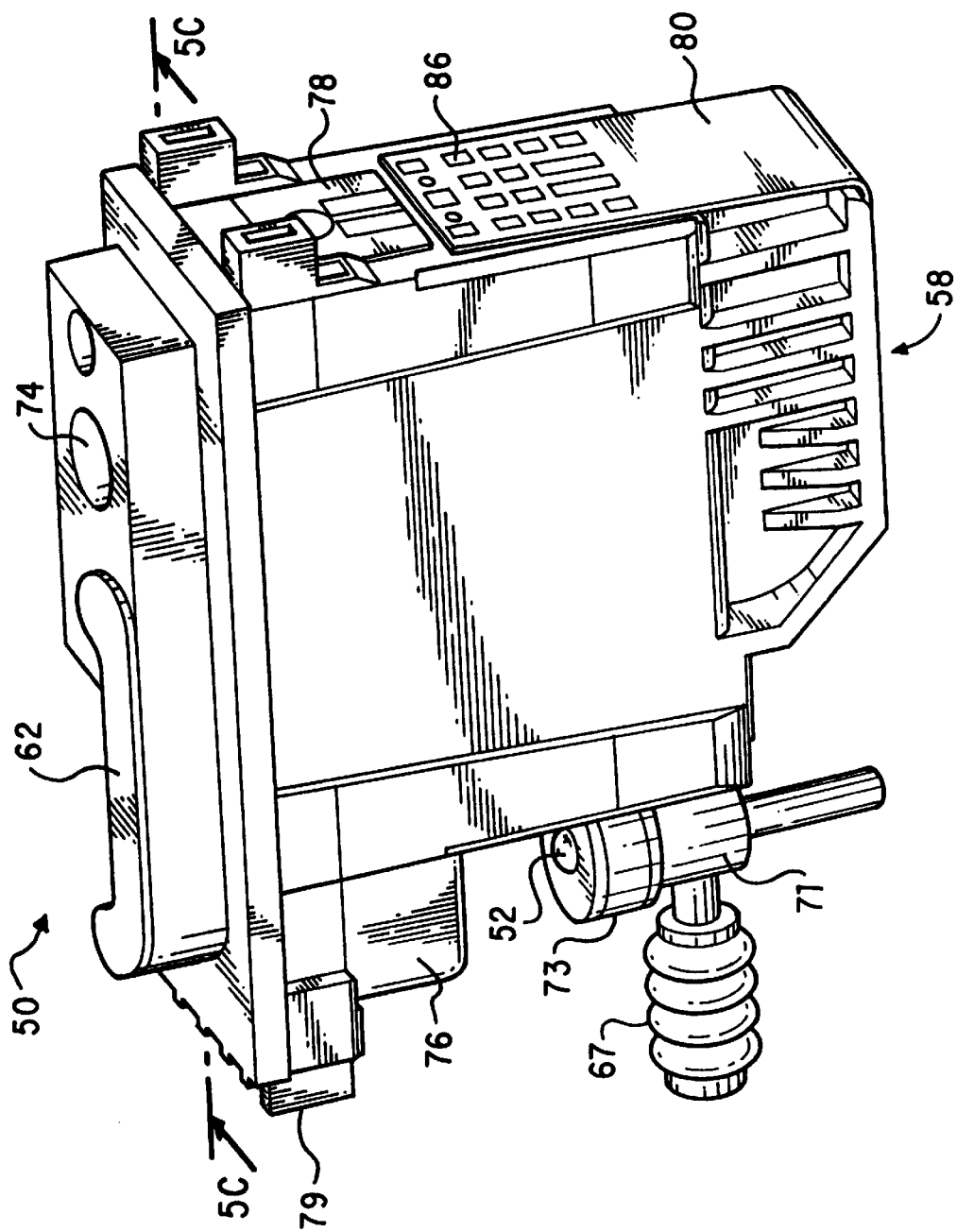
FIG. 5A is a perspective view of the preferred print cartridge and the fluid interconnect portion of the carriage.

FIG. 5A is a perspective view of one embodiment of print cartridge 50. A shroud 76 (also shown in FIG. 3B) surrounds needle 60 (obscured by shroud 76) to prevent inadvertent contact with needle 60 and also to help align septum 52 (FIG. 3A) with needle 60 when installing print cartridge 50 in carriage 48.

Coded tabs 79 align with coded slots in the carriage stalls 68 to ensure the proper color print cartridge 50 is placed in the proper stall 68. In another embodiment, coded tabs 79 are located on shroud 76.

A flexible tape 80 containing contact pads 86 leading to the printhead substrate is secured to print cartridge 50. These contact pads 86 align with and electrically contact electrodes 49 (FIG. 3A) on carriage 48. Preferably, the electrodes on carriage 48 are resiliently biased toward print cartridge 50 to ensure a reliable contact. Such carriage electrodes are found in U.S. Pat. No. 5,408,746, entitled Datum Formation for Improved Alignment of Multiple Nozzle Members in a Printer, by Jeffrey Thoman et al., assigned to the present assignee and incorporated herein by reference.

The printhead nozzle array is at location 58. An integrated circuit chip 78 provides feedback to the printer regarding certain parameters of print cartridge 50.

Figure 5B:
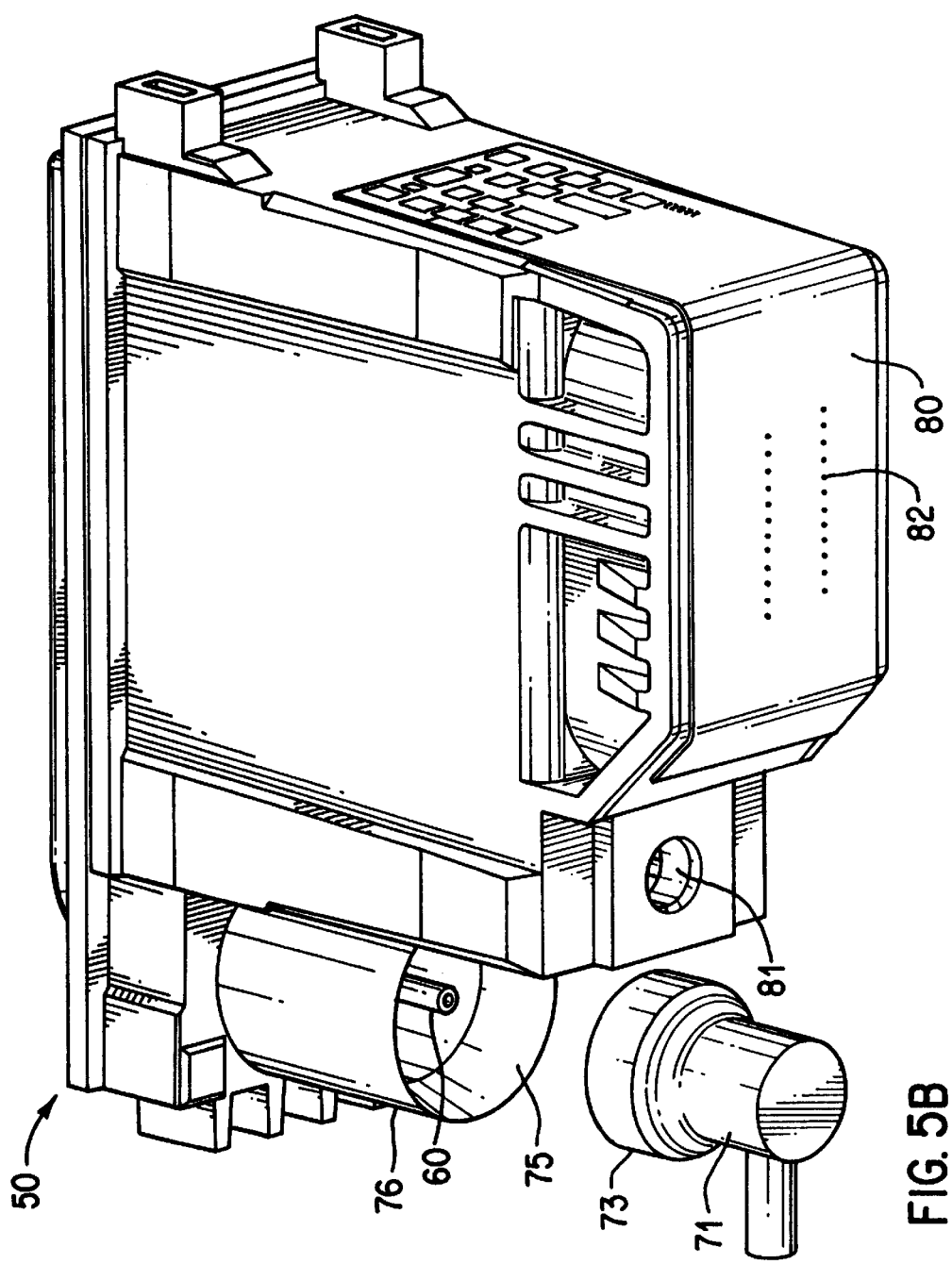
FIG. 5B is another perspective view of the preferred print cartridge and fluid interconnect of the carriage.

FIG. 5B illustrates the bottom side of print cartridge 50. Two parallel rows of offset nozzles 82 are shown laser ablated through tape 80. An Ink fill hole 81 is used to initially fill print cartridge 50 with Ink. A stopper (not shown) is intended to permanently seal hole 81 after the initial filling.

Figure 5C:
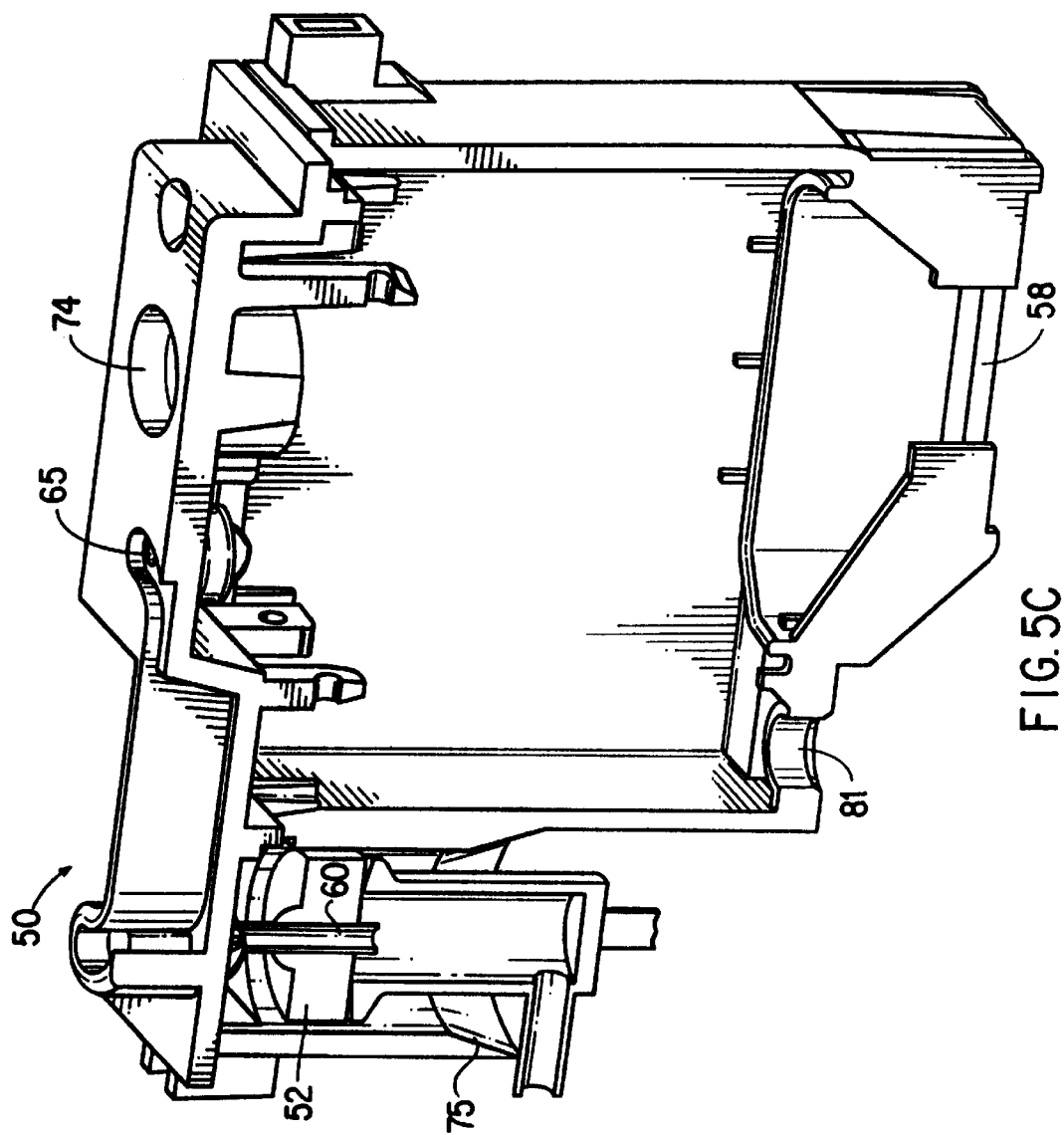
FIG. 5C is a cross-sectional view of the print cartridge of FIG. 5B now connected to the fluid interconnect on the carriage.

FIG. 5C is a cross-sectional view of print cartridge 50, without tape 80, taken along line 5C—5C in FIG. 5A. Shroud 76 is shown having an inner conical or tapered portion 75 to receive septum 52 and center septum 52 with respect to needle 60. In an alternative embodiment, needle 60 is part of a separate subassembly, and shroud 76 is a separate subassembly, for manufacturing ease and to allow color key changing by changing the shroud, assuming the color key tabs are located on the shroud.

The print cartridges and Ink supply connections described above are down-connect types where the Ink connection is made when pressing the print cartridge down into the carriage. This enables a resulting printer to have a very low profile since the Ink path does not extend above the print cartridge. In the embodiments shown having the needle extending from the print cartridge, the needle may be replaced with a septum, and the septum on the scanning carriage replaced with a hollow needle.

When in use in the printer 10, the print cartridges 50 are in fluid communication with an off-carriage Ink supply 31–34 that is releasably mounted in an Ink supply station 30. Without this fluid communication, the new off-axis design print cartridges have very little internal Ink capacity in their reservoirs and these print cartridges 50 can expel only approximately 1 cc of Ink. However, when a new cartridge 50 is manufactured, it needs to be run through an automated print quality tester. This allows the manufacturer to screen out cartridges failing to meet minimum quality standards. Additional production line processes that use Ink may include a nozzle down flush, wetfiring, and reprinting. This testing requires the use of Ink. With the new off-axis cartridge designs, the amount of Ink available internally may not be enough to make it through the automated print quality tester and the other uses of Ink described above.

Moreover, prior to printer installation by the user, the cartridge is in transit and in storage. Therefore, there is also a need to provide a means of lubricating and protecting the hollow needle 60 and the inlet port on the print cartridge 50. In particular, the hollow needle 60 and inlet port should be protected from drying, leaking Ink and air ingestion.

Figure 6:
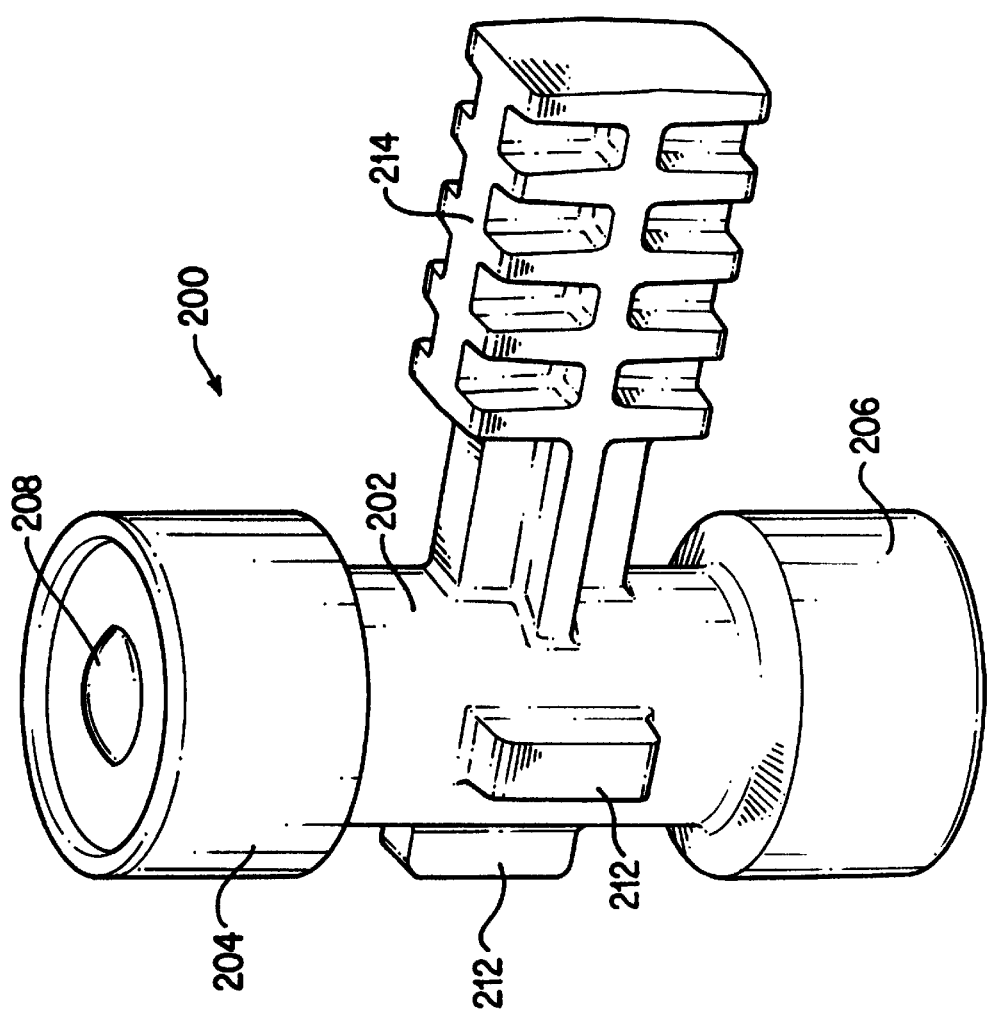
FIG. 6 is a perspective view of one embodiment of the fluidic coupling of the present invention.

Shown in FIG. 6 is an embodiment of a fluidic coupling or adapter 200 of the present invention. Fluidic coupling or adapter 200 has a central or body portion 202 and first and second shoulder portions 204, 206, respectively. First shoulder 204 includes a septum 208 on its end for interfacing with the hollow needle 60 and inlet port on the print cartridge. A second septum (not shown) is included at the end of second shoulder 206 for connecting to a needle on the production line Ink supply. The fluidic coupling or adapter 200 guides 212 for guiding and aligning the fluidic coupling 200 when inserting the coupling into the print cartridge. Also shown is a handle 214 attached to the body 202 of the fluidic coupling 200.

Figure 7:
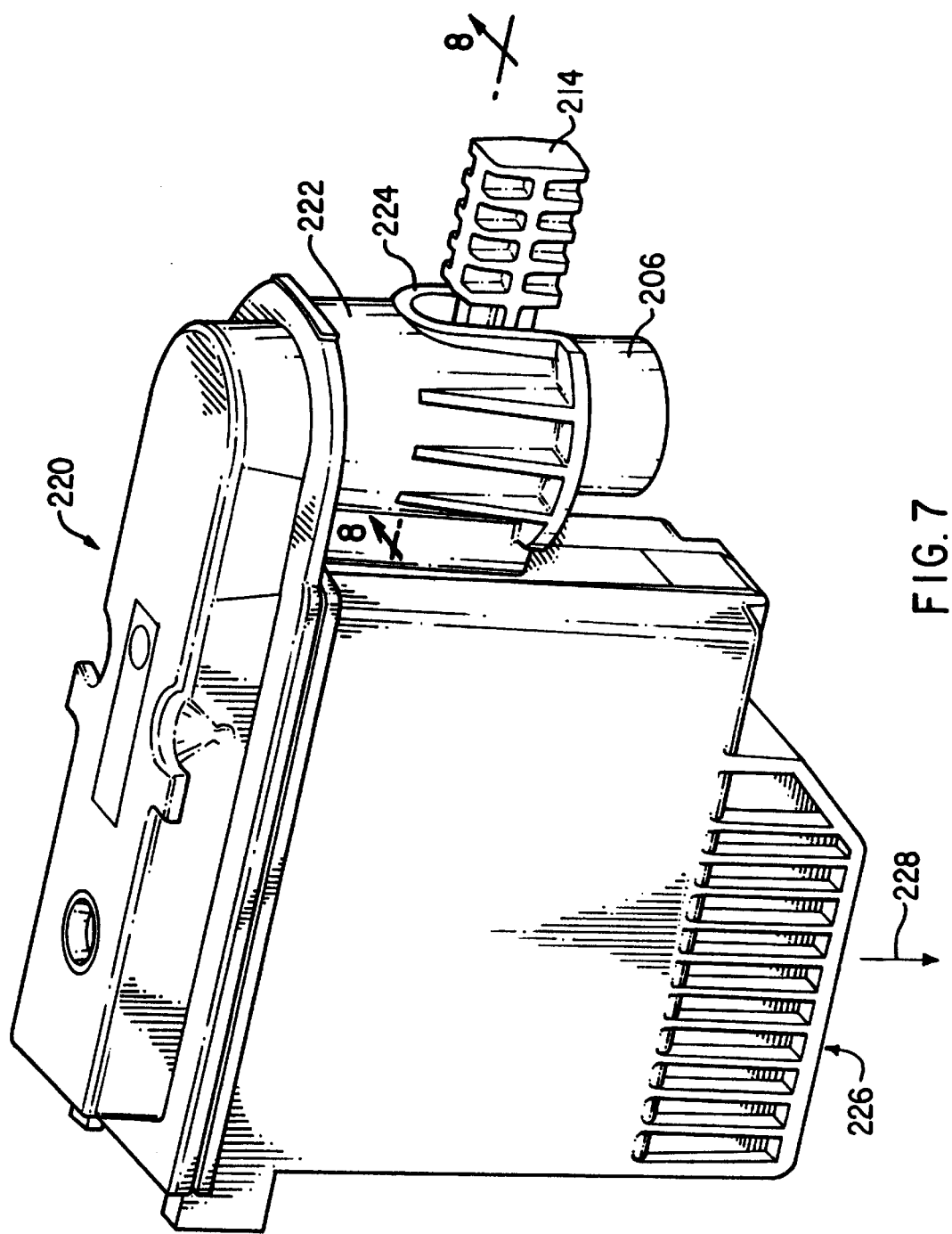
FIG. 7 is a perspective view of the fluidic coupling of FIG. 6 installed in a print cartridge.

FIG. 7 shows fluidic coupling or adapter 200 installed in a print cartridge 220. Print cartridge 220 has a shroud 222 which surrounds and protects the hollow needle (not shown). Print cartridge 220 has an opening 224 in the shroud 222 for receiving the handle 214 of the fluidic coupling or adapter 200. Shroud 222 has an inner taper which mates with a corresponding taper on the shoulder 204 and guides 212 to receive and center fluidic coupling or adapter 200 with respect to needle 60 and hold fluidic coupling or adapter 200 by friction when it is inserted upwardly into shroud 222. It will be appreciated that any type of latching method could be used to secure the coupling 200 to the printhead. The printhead nozzle array 216 located at the bottom of print cartridge 220 ejects Ink downward in direction 218.

Figure 8:
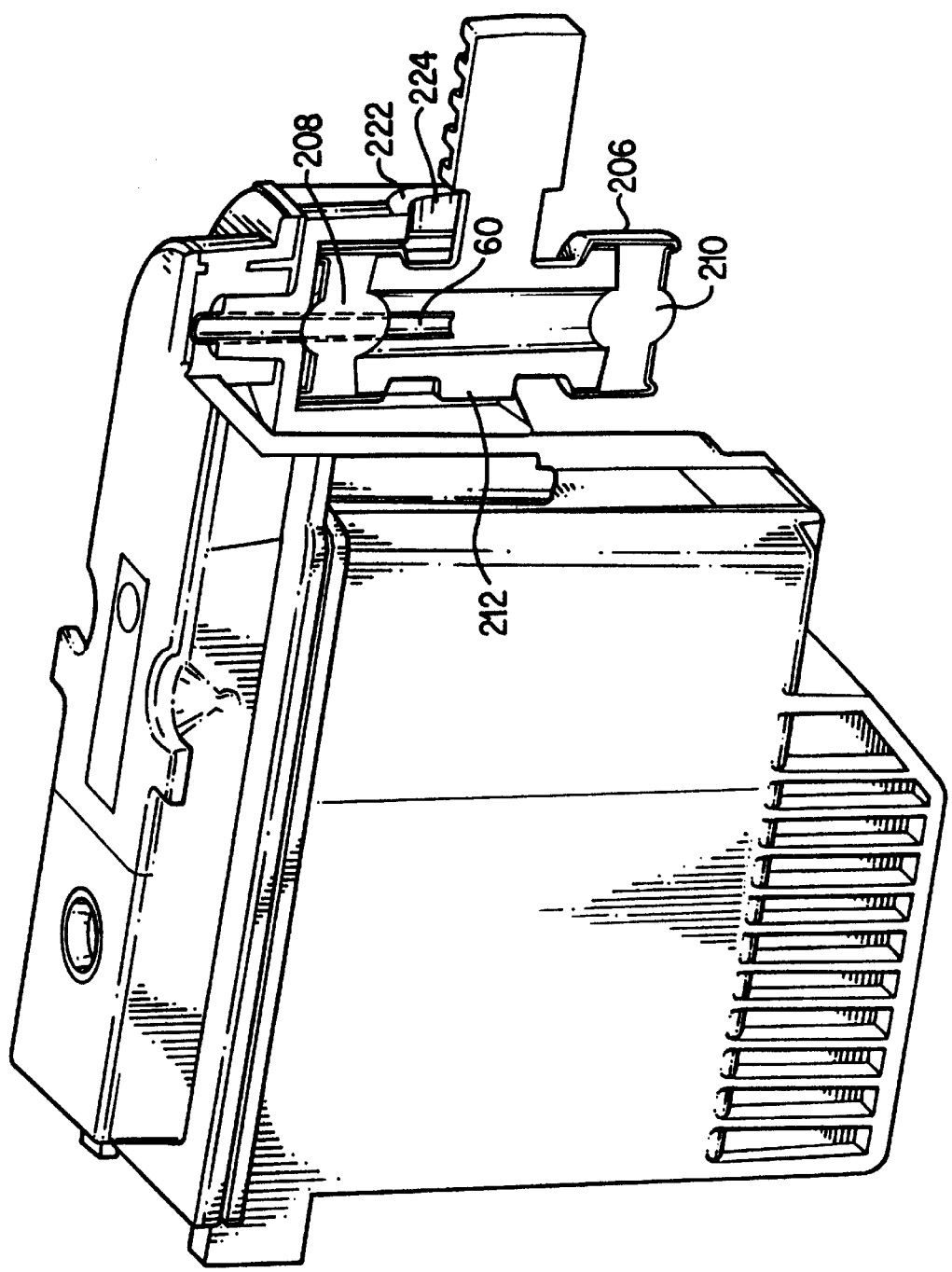
FIG. 8 is a partial cross-sectional view of the print cartridge of FIG. 8 with the fluidic coupling of FIG. 6 connected to the fluid interconnect on the print cartridge.

FIG. 8 is a cross-sectional view of print cartridge 220 taken along line A—A in FIG. 7. FIG. 8 shows the hollow needle 60 passing through septum 208 into the internal chamber 230 located within the body 202 of fluidic coupling or adapter 200. In the embodiment shown in FIG. 8, internal chamber 230 is hollow and acts as fluid conduit for Ink supplied from a needle (not shown) inserted through septum 210.

Figure 9:
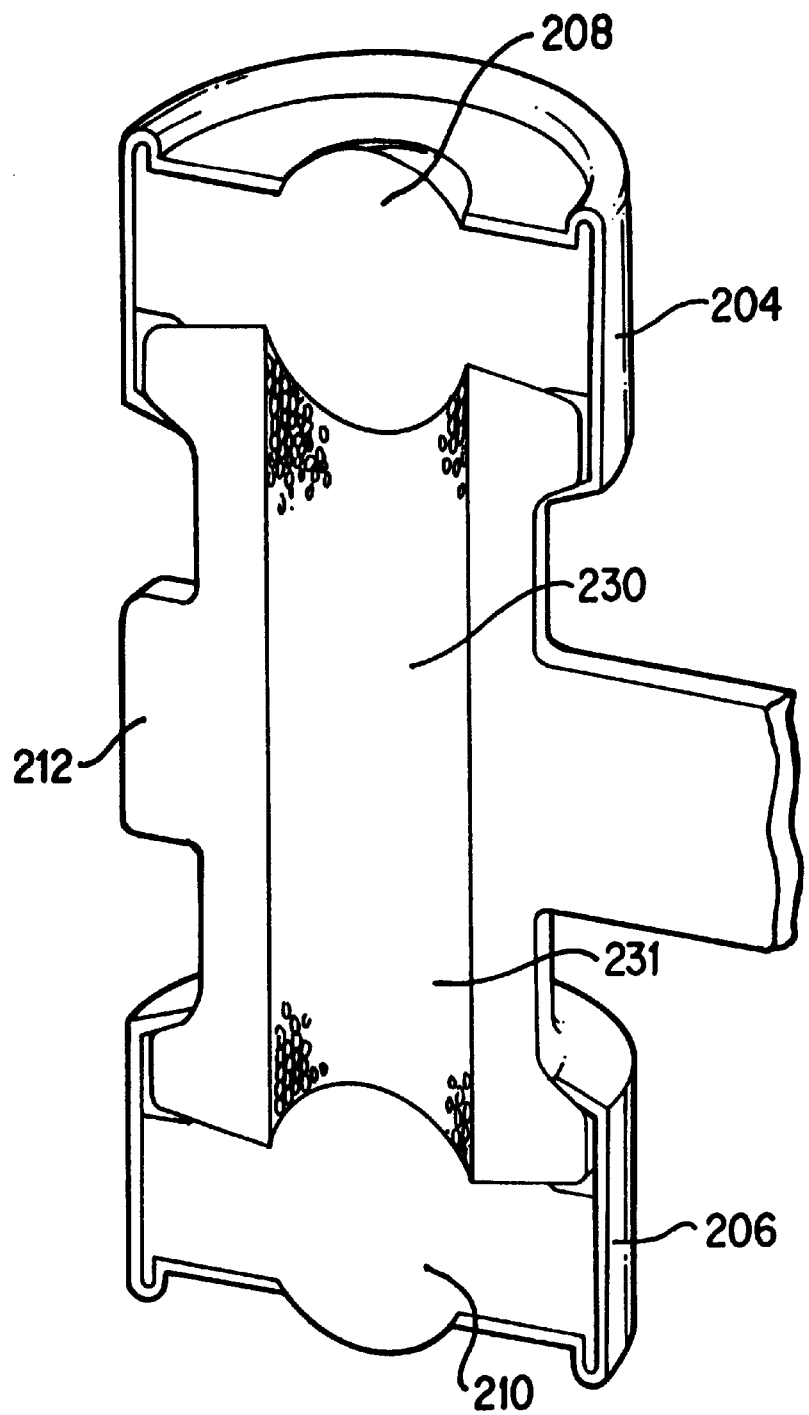
FIG. 9 is a cross-sectional view of the fluidic coupling of FIG. 6 with a foam filled internal chamber.

Another embodiment of the fluidic coupling or adapter 200 is shown in FIG. 9. In this embodiment, the internal chamber 230 contains is filled with foam 231 which is saturated with Ink. In the embodiment shown in FIG. 10 the internal chamber contains a bladder 232. The walls 234 of the bladder 232 are made of an elastic material. In FIG. 11 is shown an embodiment wherein there is a spring bag 236 located in the internal chamber 230. The spring bag walls 238 are made of a material such a flexible film such as Mylar or EVA, a multi-layer film having layers of low density polyethylene, adhesive, and metallized polyethylene terephthalate, or the nine-layer film described in U.S. Pat. No. 5,450,112, assigned to the present assignee and incorporated herein by reference. The ends of Ink bladder or the Ink bag may be heat-staked or ultrasonically welded to fluidic coupling 200 to limit movement. The spring bag 236 is biased open by a spring 242 which presses on side plates 240 located on the inner surface of the bag walls 238.

Figure 10:
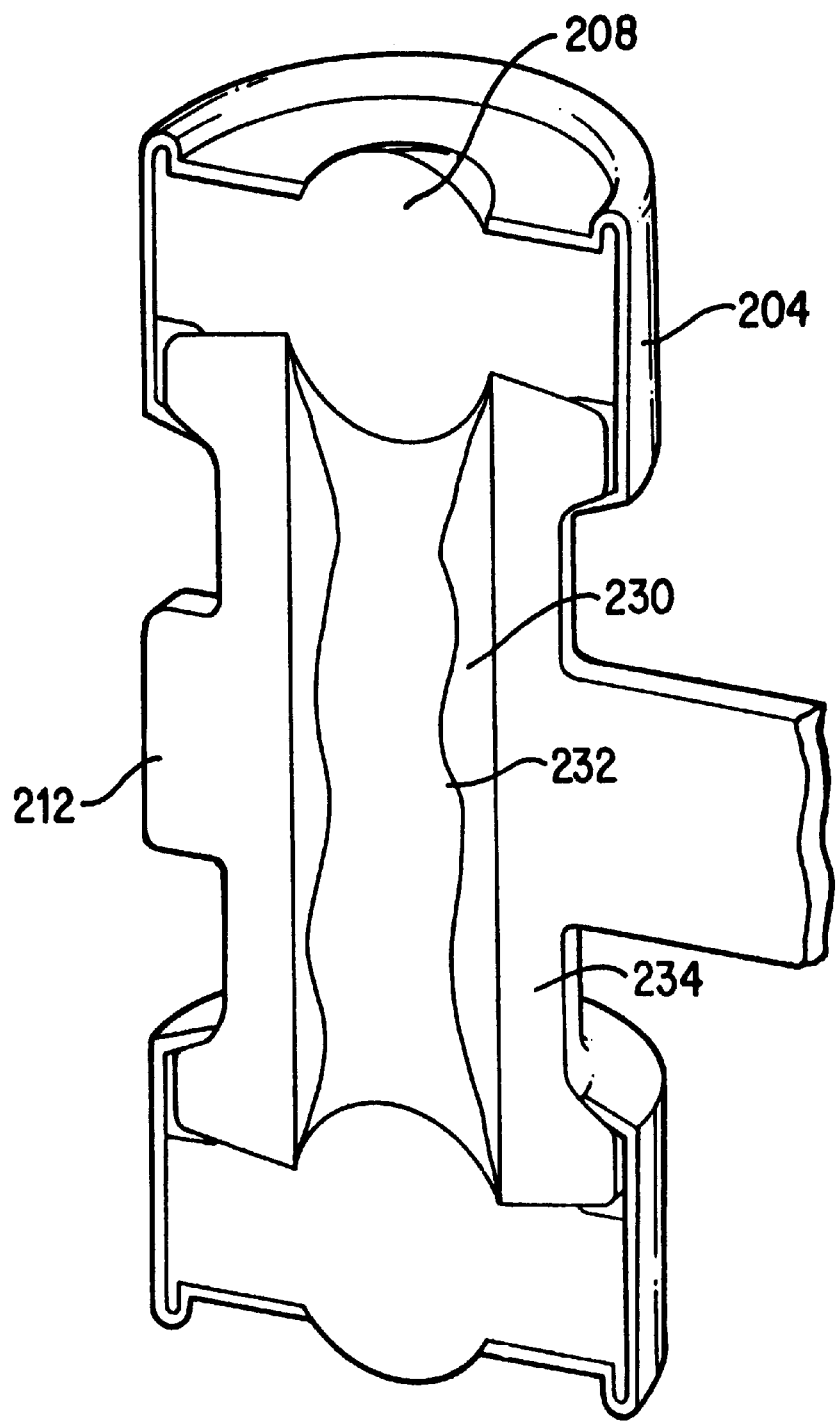
FIG. 10 is a cross-sectional view of the fluidic coupling of FIG. 6 with a bladder in the internal chamber.
Figure 11:
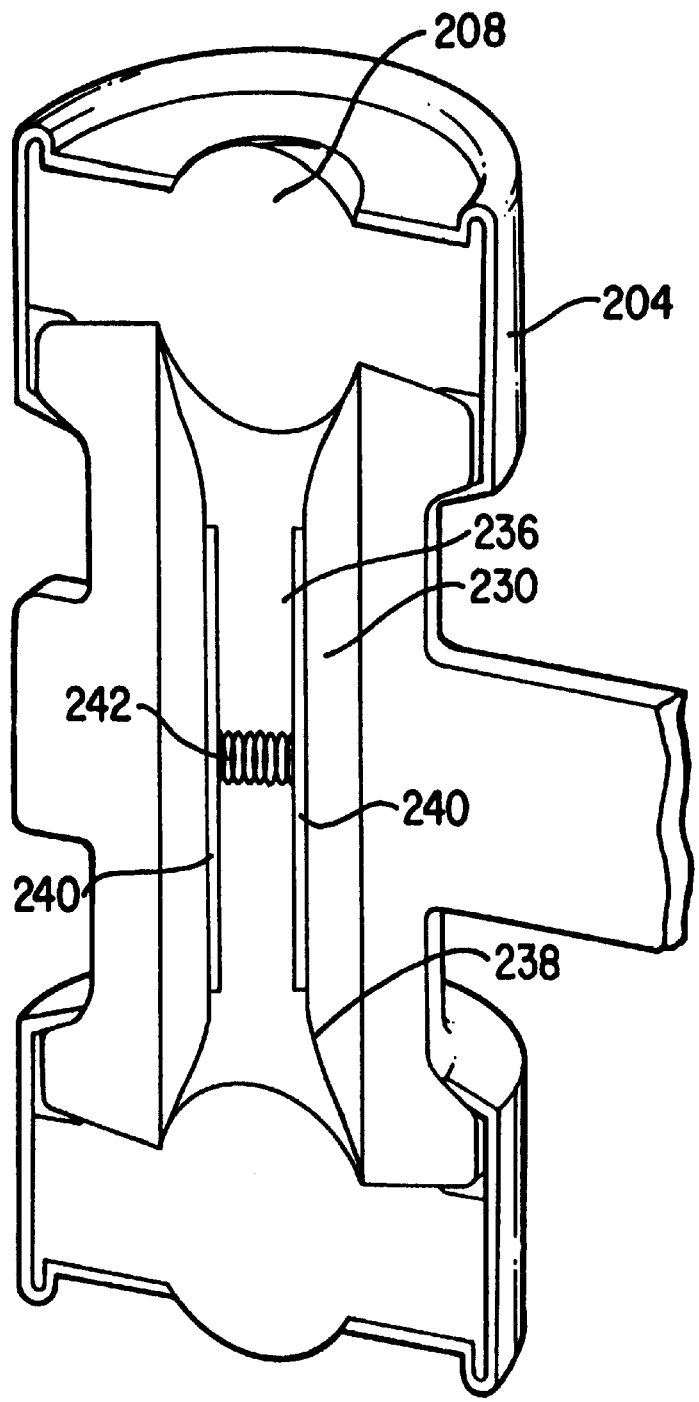
FIG. 11 is a cross-sectional view of the fluidic coupling of FIG. 6 with a spring bag in the internal chamber.

In the embodiments shown in FIGS. 10 and 11, the bladder 232 and spring bag 236 act as a compliant member. As Ink is withdrawn from the bladder or spring bag, they collapse in the chamber 230. This compliance produces back pressure in the bladder or spring bag, which increases as the bladder or spring bag collapses. See, for example, U.S. Pat. No. 4,500,895 (Ink bladder type reservoir) and U.S. Pat. No. 5,359,353 (spring-bag type reservoir) all assigned to the assignee of the present invention and incorporated herein by reference.

The embodiments shown in FIGS. 9, 10 and 11, in addition to providing the functions indicated above, provides an Ink reservoir that can travel with the cartridge during production, eliminating the need to refill the print cartridge. As can be appreciated, this reservoir can be sized to hold anywhere from 0.5 to 50 cc of Ink. Thus, it could even provide an on-carriage auxiliary reservoir, eliminating the need for an off-axis Ink supply.

Figure 12A:
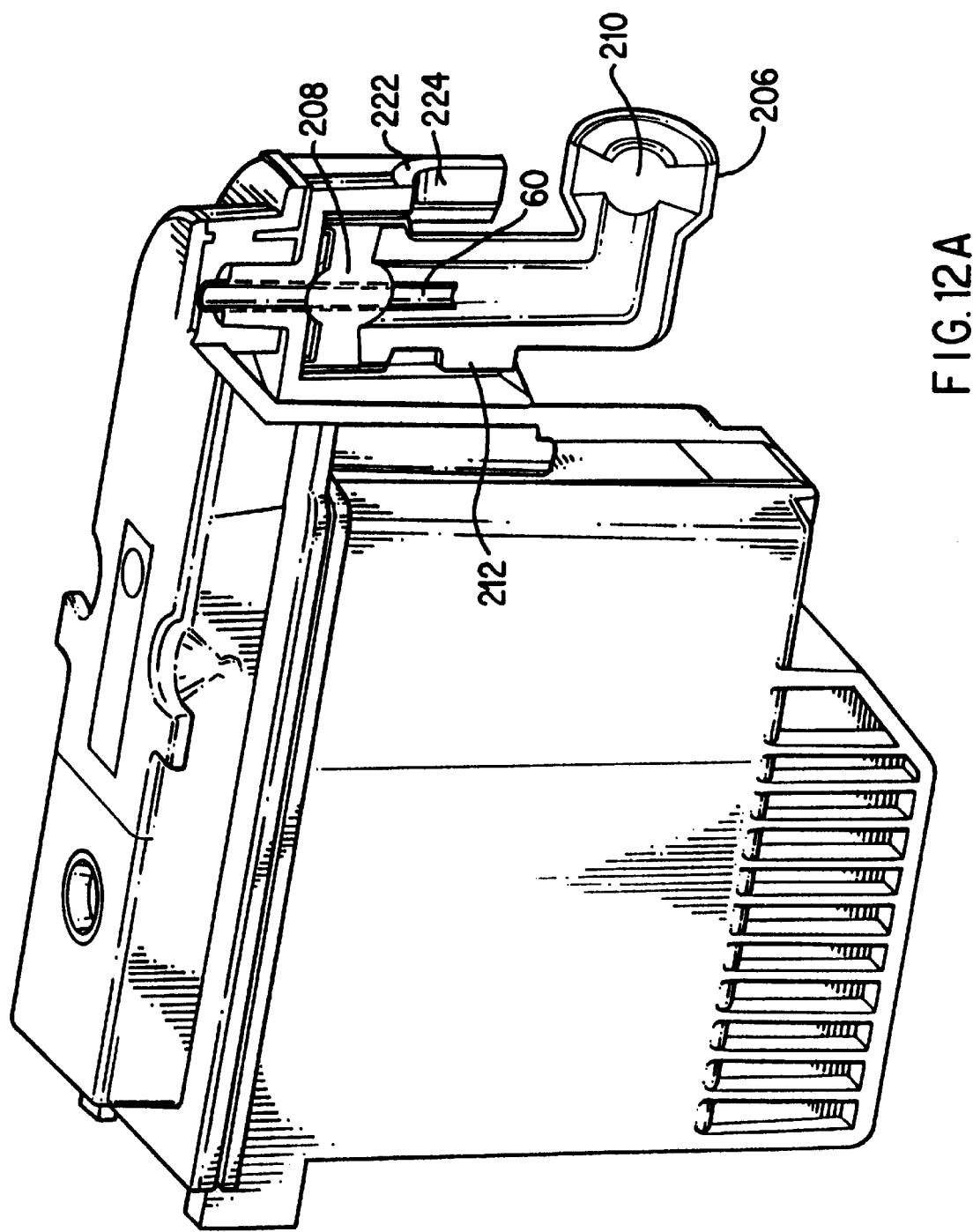
FIGS. 12A and 12B are partial cross-sectional views of the print cartridge of FIG. 8 with an alternative embodiments of the fluidic coupling connected to the fluid interconnect on the print cartridge.
Figure 12B:
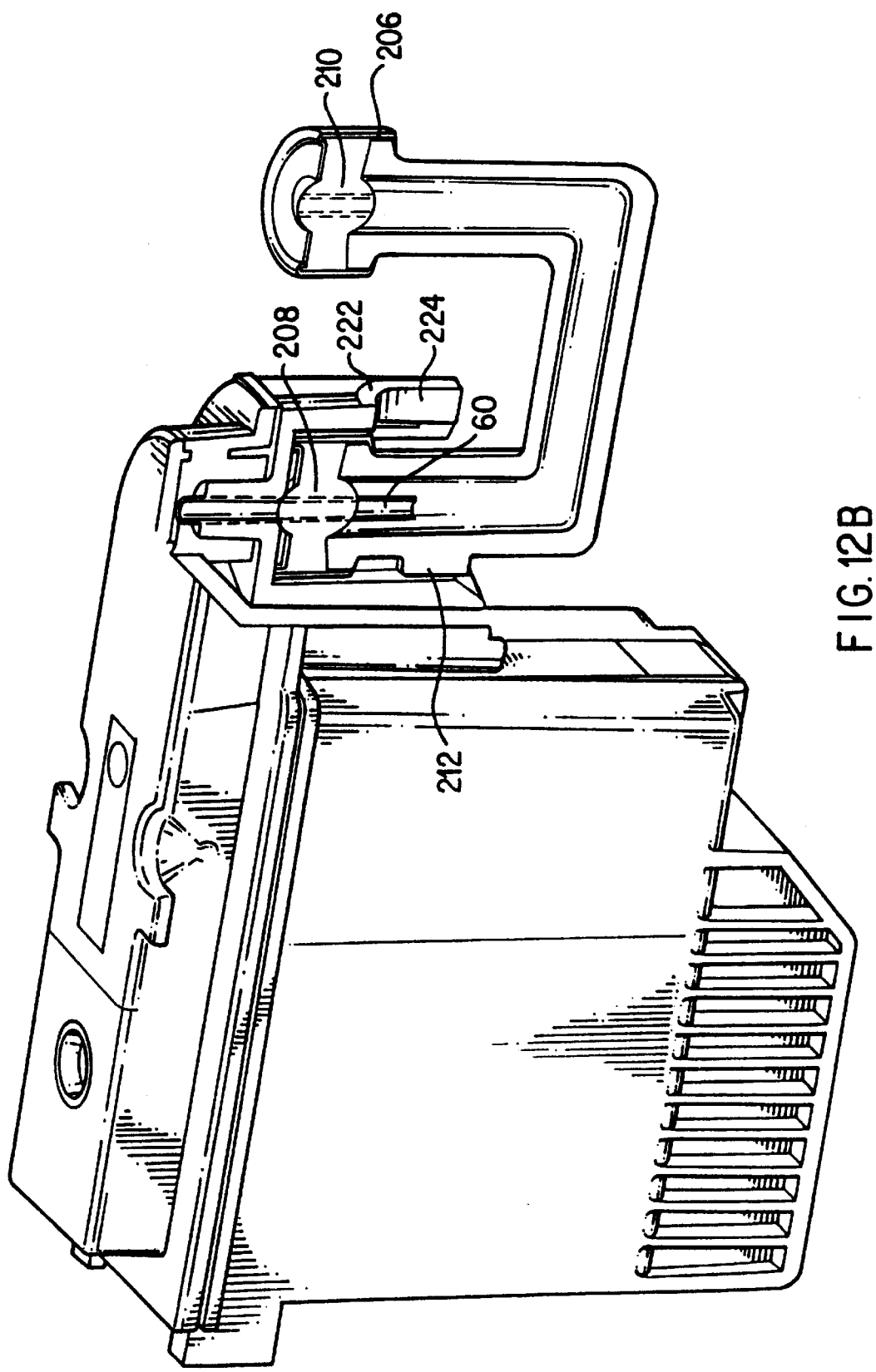

Shown in FIGS. 12A and 12B are different shapes for the fluidic coupling of the present invention. It will be appreciated that other shape variations are possible and within the scope of the present invention.

The embodiments of the fluidic coupling or adapter 200 shown in FIGS. 6–11 have the following functions: (1) prevention of Ink leakage from the needle and inlet port on the print cartridge, (2) prevention of air from being ingested into the print cartridge, (3) provides an auxiliary on-board Ink reservoir, and (4) provides an inlet and fluidic coupling from another Ink supply source such as, for example, on the print cartridge production line.

Figure 13:
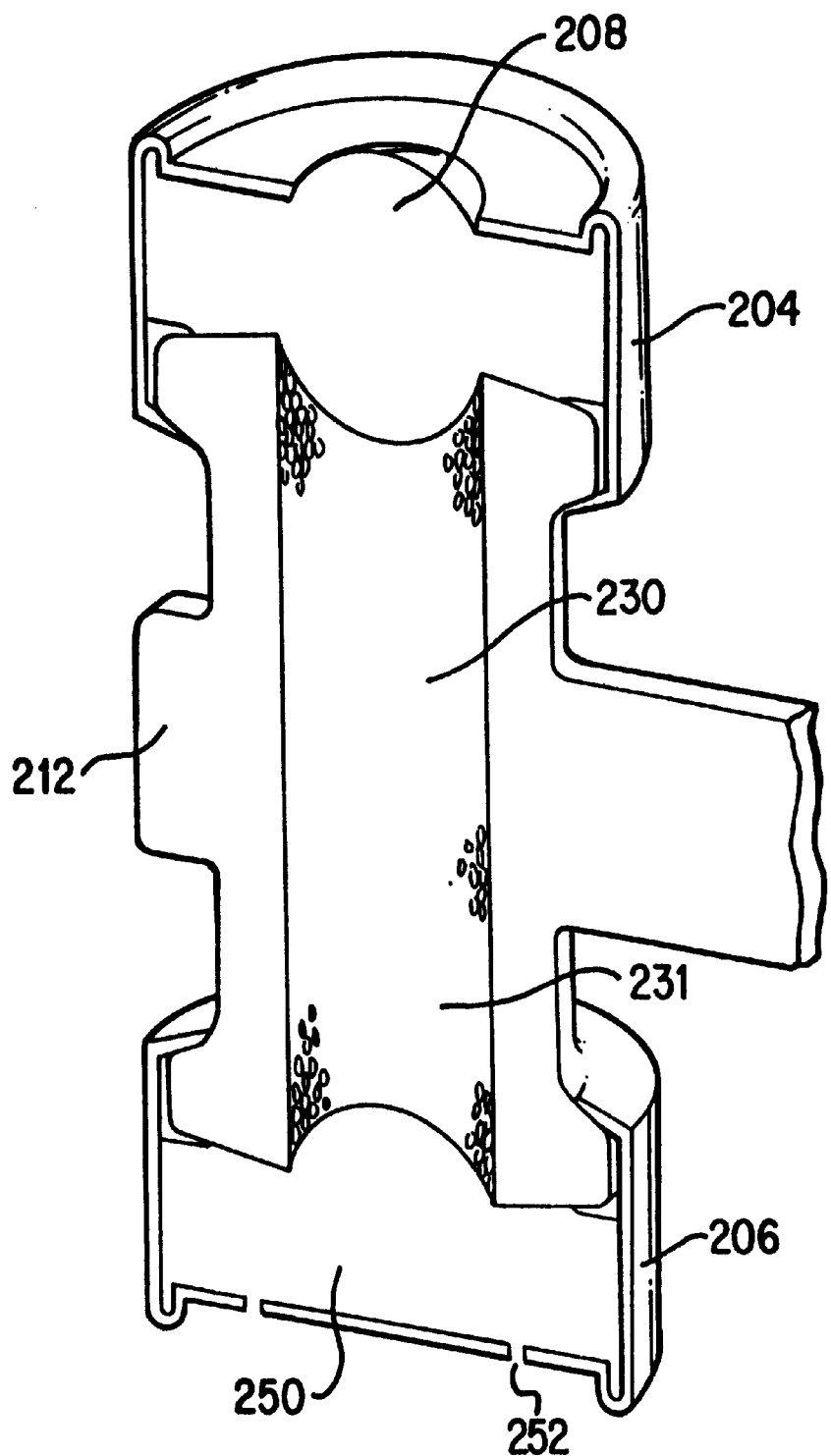
FIG. 13 is a cross-sectional view of the fluidic adapter of the present invention.

Shown in FIG. 13 is an embodiment of the present invention which provides functions 1–3 described above but does not provide a fluidic coupling to another Ink supply. In this embodiment there is only one septum 208 for interfacing with the needle 60 on the print cartridge 50. Below the Ink saturated foam 231 is unsaturated foam. Vent holes 252 are provide to allow entry of air as Ink is withdrawn. Optionally a material such as Gortex which allows the passage of air but not liquid may be used at the interface of the saturated foam. While the embodiment shown in FIG. 12 has a foam filled internal chamber, the bladder and spring bag embodiments described above could also be utilized.

In the embodiments shown above, the shape of the body 202 and the shoulders 204, 206 of the fluidic coupling 200 are cylindrical any other shape could be utilized. Moreover the shape of the body 202 and the shoulders 204, 206 need not be the same. The only restriction being the ability to mate the shoulder 204 of the fluidic coupling 200 to the needle 60 and shroud 222 to effectuate a seal between the fluidic coupling 200 and the inlet port of the print cartridge 220.

In the embodiments shown above having the hollow needle extending from the print cartridge, the needle may be replaced with a septum, and the septum on the fluidic coupler replaced with a hollow needle. This is also the case for the septum which connects to an auxiliary Ink supply.

Figure 14:
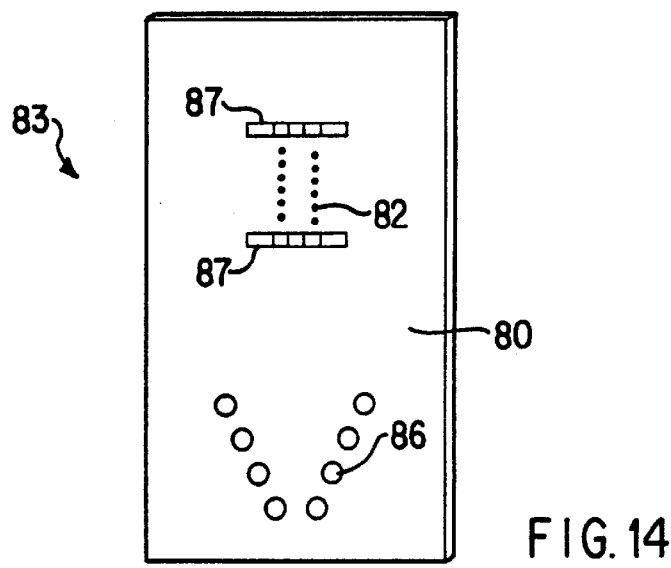
FIG. 14 is a simplified front view of the print head assembly on a preferred print cartridge.
Figure 15:
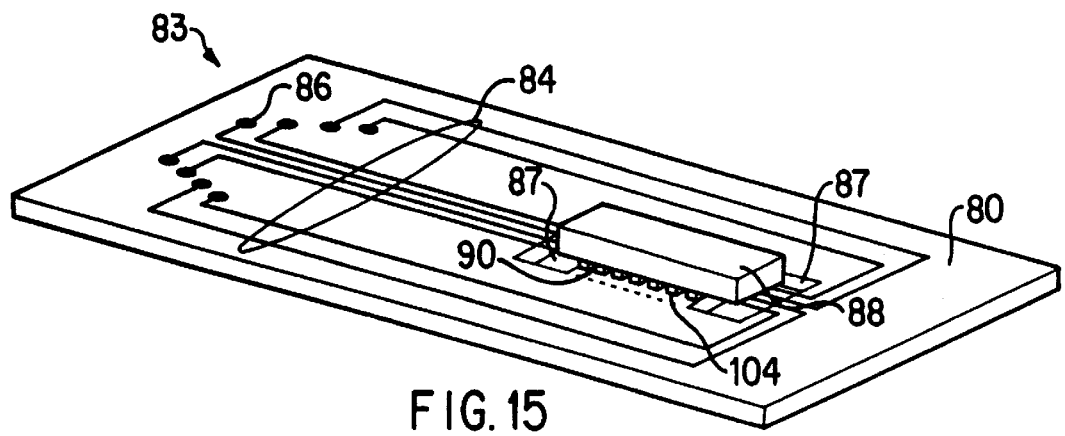
FIG. 15 is a perspective view of the back side of the printhead assembly.
Figure 16:
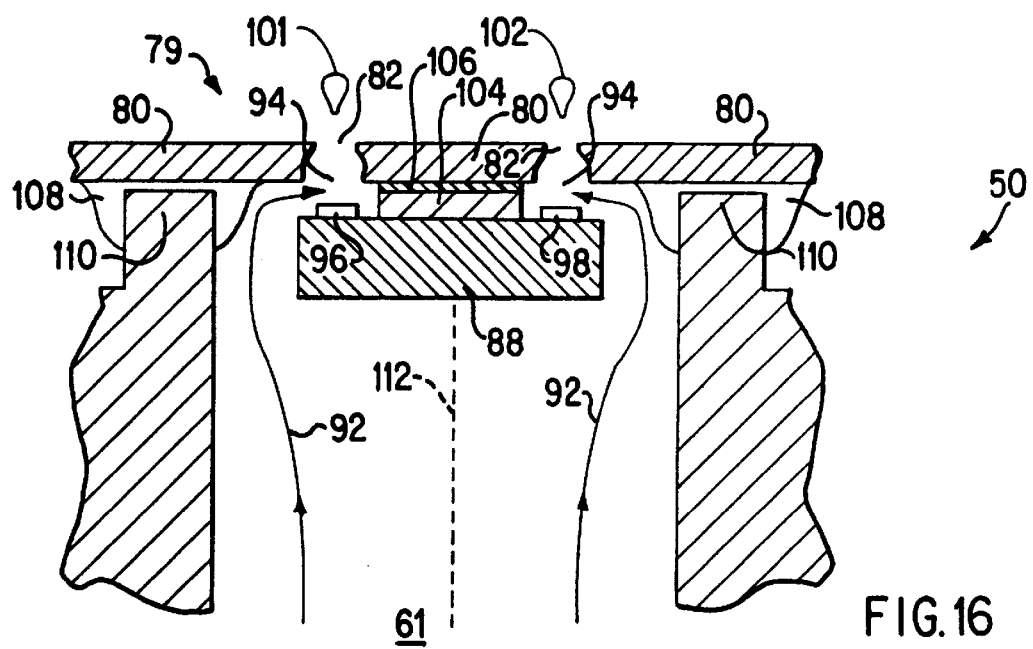
FIG. 16 is a cross-sectional view of the portion of the print cartridge containing the printhead assembly showing the flow of Ink to the Ink ejection chambers in the printhead.

FIGS. 14, 15, and 16 illustrate the basic principles of the printhead assembly 83. Printhead assembly 83 is preferably a flexible polymer tape 80 (FIG. 5B) having nozzles 82 formed therein by laser ablation. Conductors 84 (FIG. 15) are formed on the back of tape 80 and terminate in contact pads 86 for contacting electrodes on carriage 48. The other ends of conductors 84 are bonded through windows 87 to terminals of a substrate 88 (FIG. 15) on which are formed the various Ink ejection chambers and Ink ejection elements. The Ink ejection elements may be heater resistors or piezoelectric elements. The printhead assembly may be similar to that described in U.S. Pat. No. 5,278,584, by Brian Keefe, et al., entitled "Ink Delivery System for an Inkjet Printhead," assigned to the present assignee and incorporated herein by reference. In such a printhead assembly, Ink within print cartridge 50 flows around the edges of the rectangular substrate 88 and into Ink channels 90 leading to each of the Ink ejection chambers.

FIG. 16 illustrates the flow of Ink 92 from the Ink chamber 61 within print cartridge 50 to Ink ejection chambers 94. Energization of the Ink ejection elements 96 and 98 cause a droplet of Ink 101, 102 to be ejected through the associated nozzles 82. A photoresist barrier layer 104 defines the Ink channels and chambers, and an adhesive layer 106 affixes the flexible tape 80 to barrier layer 104. Another adhesive 108 provides a seal between tape 80 and the plastic print cartridge body 110. In one embodiment, a wall 112 separates the Ink flow paths around the two edges of substrate 88, and a different color Ink is supplied to each side of wall 112.

The conductor portion of the flexible tape 80 is glued or heat-staked to the print cartridge body 110.

A demultiplexer on substrate 88 demultiplexes the incoming electrical signals applied to contact pads 86 and selectively energizes the various Ink ejection elements to eject droplets of Ink from nozzles 82 as printhead 79 scans across the print zone. In one embodiment, the dots per inch (dpi) resolution is 300 dpi, and there are 300 nozzles 82. In another embodiment, at least the black Ink cartridge prints at a resolution of 600 dpi.

Other embodiments of scanning carriages and print cartridges are described in U.S. patent application Ser. No. 08/706,121, filed Aug. 30, 1996, entitled "Inkjet Printing System with Off-Axis Ink Supply Having Ink Path Which Does Not Extend above Print Cartridge," which is herein incorporated by reference.

The Ink within each of the off-axis Ink supply cartridges 31–34 may be at atmospheric pressure, whereby Ink is drawn into each of print cartridges 18, 50 220 by a negative pressure within each print cartridge determined by a regulator internal to each print cartridge. Alternatively, the off-axis Ink supply cartridges may be pressurized. In either the unpressurized or pressurized Ink supply embodiments, a pressure regulator is used within the print cartridge for regulating the pressure of the Ink chamber within the print cartridge. Hence, the pressure in the off-axis Ink supply system may be unregulated. The regulator causes the Ink chamber within the print cartridge to have a slight, but substantially constant, negative pressure (e.g., −2 to −7 inches of water column) to prevent Ink drool from the nozzles of the printhead. If the off-axis Ink supply system is at atmospheric pressure, this slight negative pressure in the print cartridge also acts to draw Ink from the off-axis Ink supply system even if the location of the Ink supply system is slightly below the print cartridge. The regulator also enables the use of pressurized off-axis Ink supplies while maintaining the desired negative pressure within the Ink chamber in the print cartridge. The regulator can be designed to provide a wide range of negative pressures (or back pressures) from 0 to 50 inches of water column, depending on the design of the printhead. One embodiment of a pressure regulator is described in U.S. patent application Ser. No. 08/706,121, filed Aug. 30, 1996, entitled "Inkjet Printing System with Off-Axis Ink Supply Having Ink Path Which Does Not Extend above Print Cartridge," which is herein incorporated by reference.

Figure 17:
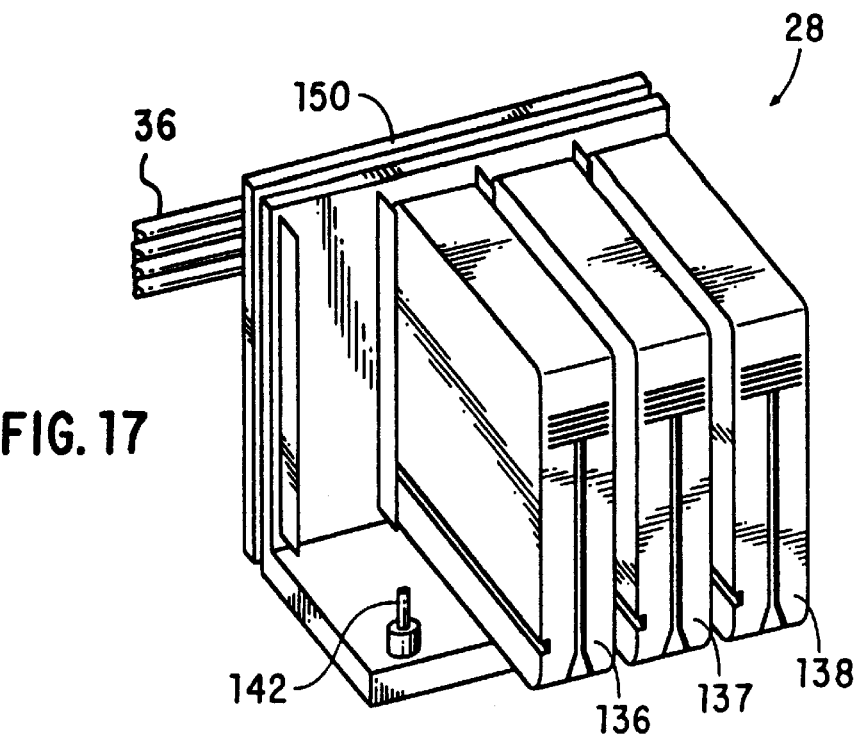
FIG. 17 is an Ink supply station having Ink supply cartridges installed therein in accordance with one embodiment of the invention.
Figure 18:
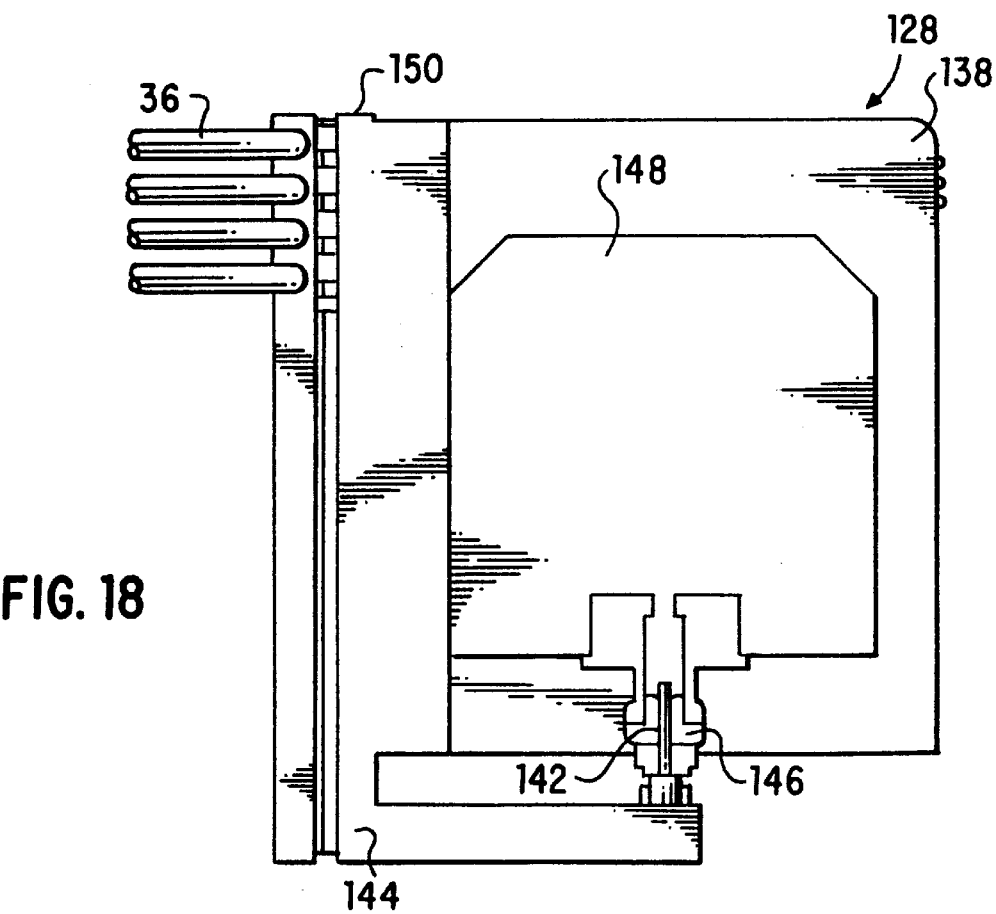
FIG. 18 is a side view in partial cross-section of the Ink supply station in FIG. 16.

FIG. 17 is a perspective view of another embodiment of an off-axis Ink supply station 128. Tubes 36 from an off-axis Ink supply station 128 supply Ink to the print cartridges (not shown). In the particular embodiment shown in FIG. 17, only three out of the four color Ink supply cartridges 136–139 are installed in Ink supply station 128. A hollow needle 142 extending from a stall in the Ink supply station 128, to be described in greater detail with respect to FIG. 18, is in fluid communication with one of tubes 36. The Ink within each of Ink supply cartridges 136–139 is at atmospheric pressure, and Ink is drawn into each of print cartridges 122–125 by a negative pressure within each print cartridge 122–125 determined by a regulator internal to each print cartridge.

Figure 19:
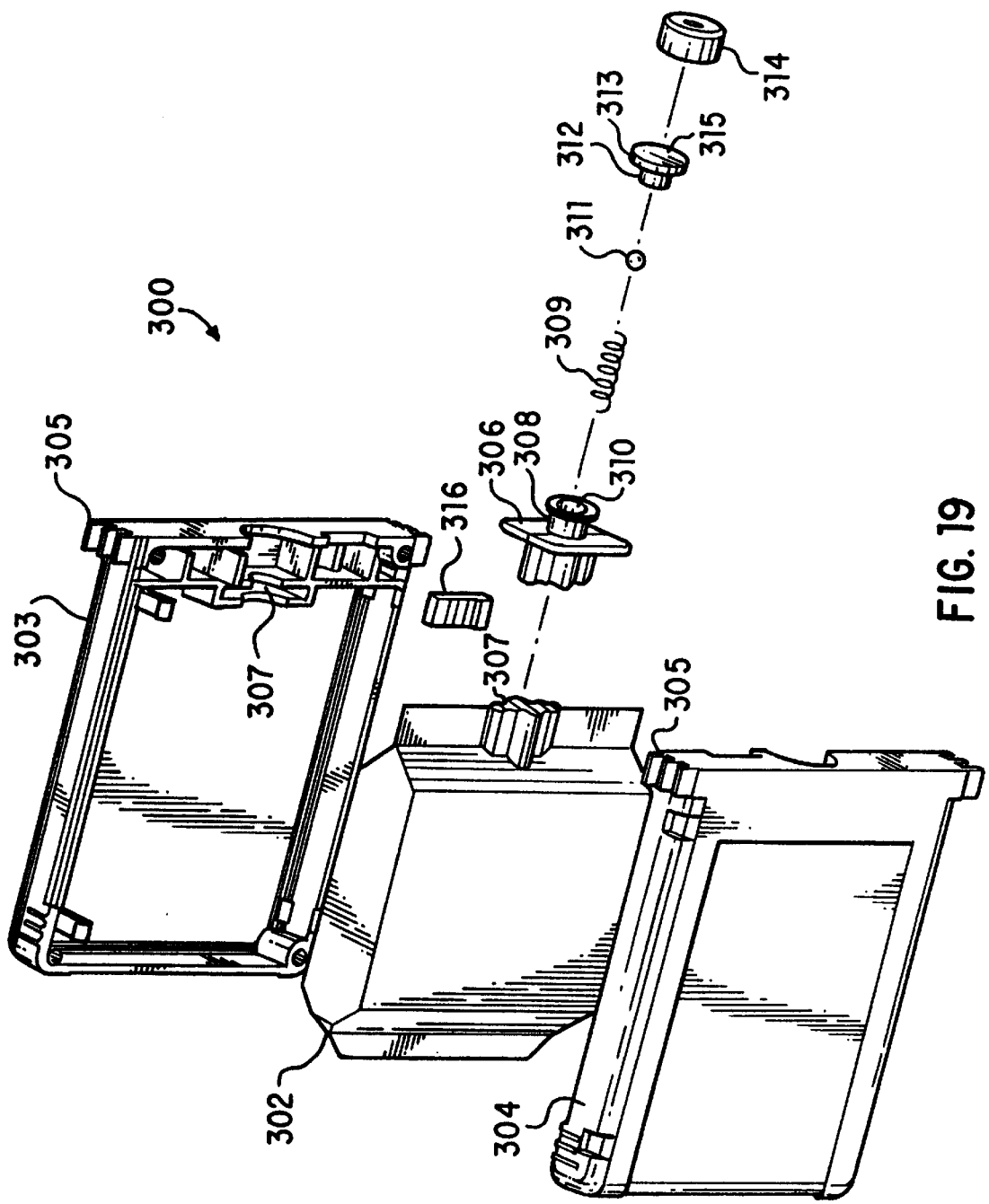
FIG. 19 is an exploded view of a non-pressurized Ink supply cartridge.

FIG. 19 is an exploded view of a non-pressurized Ink supply cartridge 300 such as shown in FIGS. 2, 16 and 17. Such an Ink supply cartridge 300 is simply removed from the Ink supply support (e.g., support 144 in FIG. 18) and disposed of once its supply of Ink has been depleted. The connection of such an Ink supply cartridge 300 to the fluid interconnect has been described with respect to FIG. 18.

The non-pressurized Ink supply cartridge 300 consists of a collapsible Ink bag 302 and two rigid plastic housing members 303 and 304. Ink bag 302 may be formed of a flexible film such as Mylar or EVA, a multi-layer film having layers of low density polyethylene, adhesive, and metallized polyethylene terephthalate, or the nine-layer film described in U.S. Pat. No. 5,450,112, assigned to the present assignee and incorporated herein by reference. The ends of Ink bag 302 may be heat-staked or ultrasonically welded to housing member 303 or 304 to limit movement of bag 302.

Coded tabs 305 align with slots formed in the Ink supply support to ensure the proper color Ink supply cartridge is inserted into the correct stall of the Ink supply support. In one embodiment, the Ink supply support also latches onto tab 305, using a spring-loaded latch, to secure cartridge 300 and to provide tactile feedback to the user that cartridge 300 is properly installed.

A plastic Ink bag fitment 306 is partially inserted through an opening 307 in Ink bag 302 and sealed with respect to opening 307 by glue or heat fusing. A poppet 308 extends from fitment 306. Bag fitment 306 is held firmly in place by a slot 307 formed in the plastic housing members 303 and 304.

A poppet spring 309 is inserted through a hole 310 in poppet 308 followed by a poppet ball 311. Ball 311 may be stainless steel or plastic.

An end 312 of a rubber septum 313 is then inserted into hole 310 in poppet 308. Septum 313 is then crimped and secured to poppet 308 using a crimped cap 314.

Septum 313 has a slit 315 formed through its center through which a hollow needle 142 (FIG. 18), in fluid connection with a print cartridge, is inserted as shown in FIG. 18. Slit 315 in septum 313 is automatically urged closed by the resiliency of septum 313 when the needle is removed.

Poppet spring 309 and poppet ball 311 serve to provide added assurance that no Ink will leak through slit 315 in septum 313. When there is no needle inserted through slit 315, poppet spring 309 urges poppet ball 311 against the closed slit 315 so that ball 311 in conjunction with the closing of slit 315 provides a seal against Ink leakage.

It is possible to design the fluid interconnect using a septum without the poppet, or a poppet without the septum. A septum without the poppet will reliably seal around a needle with a radial seal. However, when the Ink supply with a septum has been installed in the printer for a long time, the septum will tend to take on a compression set. Upon removal, the septum may not completely reseal itself. If the supply is tipped or dropped, Ink may leak out. A poppet valve (by itself) has the advantage (relative to a septum) of self-sealing without a compression set issue. However, it is less reliable in that it does not seal around the needle. Thus, to ensure a leak-tight fluid interconnection with the cartridge, some kind of face seal must be established. In addition, poppet valves vary in reliability when the surface they seal against is hard plastic—small imperfections in the sealing surface tend to lead to leaks. The combination of the septum/poppet valve overcomes these limitations by utilizing the advantages of both: the septum's very good sealing around the needle while eliminating the compression set issue. Additionally, the inside surface of the septum provides a compliant sealing surface for the poppet valve that is less sensitive to imperfections.

In the preferred embodiment, an integrated circuit sensor/memory 316 is permanently mounted to Ink supply cartridge 300. This circuit provides a number of functions, including verifying insertion of the Ink supply, providing indication of remaining Ink in the supply, and providing a code to assure compatibility of the Ink supply with the rest of the system.

In an alternate embodiment, Ink bag 302 is provided with a positive pressure. This enables the tubes connecting the Ink supply to the print cartridges to be thinner and also allows the Ink supply station to be located well below the print cartridges. By providing Ink bag 302 with rigid side panels 318 to distribute the spring force, a spring can be used to urge the sides of Ink bag 302 together to create a positive internal pressure. Bow springs, spiral springs, foam, a gas, or other resilient devices may supply the spring force. In another embodiment, Ink bag 302 may be pressurized by an intermittent pressure source, such as a gas. Alternatively, a pump within the Ink supply may be used as described in described in U.S. patent application Ser. No. 08/706,121, filed Aug. 30, 1996, entitled "Inkjet Printing System with Off-Axis Ink Supply Having Ink Path Which Does Not Extend above Print Cartridge," which is herein incorporated by reference.

Upon depletion of the Ink from the reservoir 324, or for any other reason, the Ink supply 320 can be easily removed from the docking bay 338. Upon removal, the fluid outlet 328 and the fluid inlet 342 are closed to help prevent any residual Ink from leaking into the printer or onto the user. The Ink supply may then be discarded or stored for reinstallation at a later time. In this manner, the present Ink supply 320 provides a user of an Ink-jet printer a simple, economical way to provide a reliable and easily replaceable supply of Ink to an Ink-jet printer.

The illustrated plastic sheet is flexible to allow the volume of the reservoir to vary as Ink is depleted from the reservoir. This helps to allow withdrawal and use of all of the Ink within the reservoir by reducing the amount of back pressure created as Ink is depleted from the reservoir.

The print cartridge, carriages, and off-axis Ink delivery systems described herein may be used in various combinations to provide Ink to the nozzles of the printheads in the print cartridges. As one example, any of the print cartridges described may be used with either the pressurized or unpressurized Ink supply cartridges. The Ink supply cartridges may be arranged in a printer for convenient access, ease of use, maximum utilization of space, and allowing for the required delivered Ink volume. The pressure regulator, being integral with the print cartridge in the preferred embodiment, allows printhead performance to be independent of the relative heights of the Ink supply and printhead.

The lowest cost system will typically be one with unpressurized supplies. However, pressurization may be required for some situations. This is best understood by considering causes of dynamic and static pressure changes. The static pressure in the printhead is defined as that which exists when the printhead is parked and not operating and is typically optimally set to −2 to −6 inches of water column by the spring in the regulator. However, if the Ink supplies are located more than 6 inches below the printhead, then the regulator will always be open (assuming the above set point range), and the static pressure will always be the difference in height. To make matters worse, the pressure of concern is dynamic, defined as the pressure experienced in the printhead during operation. Thus, the actual dynamic pressure will be an even larger negative number and will be outside the regulator range.

Pressurizing the Ink supply will solve this problem. This can be done by the aforementioned method or by using springs to provide constant Ink supply pressure. This can be done to counteract the relative heights, and other factors that affect the dynamic pressure drop. Factors that increase the dynamic pressure drop include rate of Ink usage by the printhead, decreasing tubing diameter, increasing tubing length, and increasing Ink viscosity. The pressurization must be increased until the pressure is entirely controlled by the regulator to within the print quality driven pressure specification.

Figure 20:
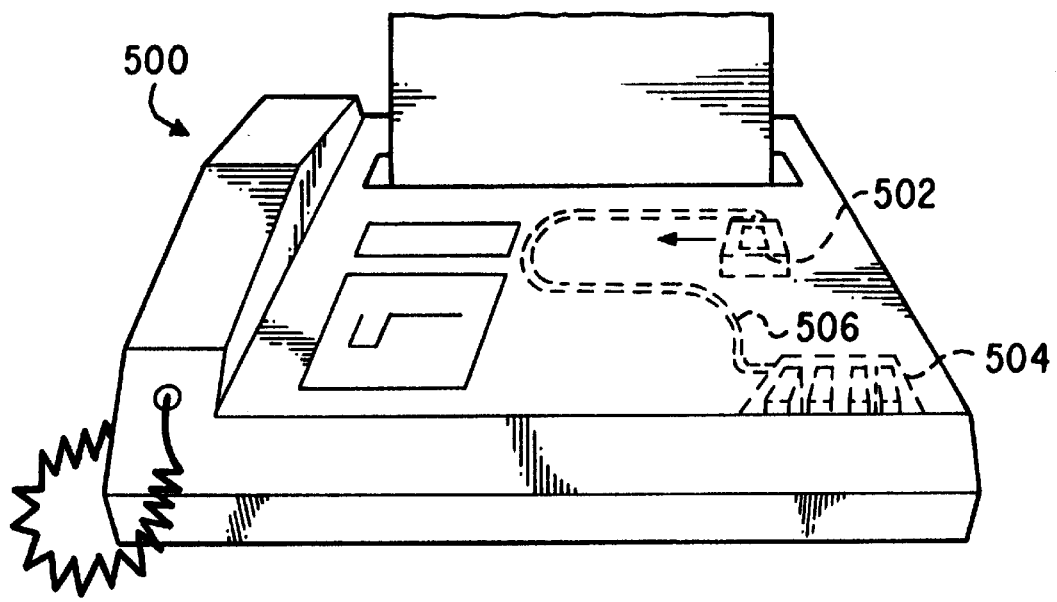
FIG. 20 is a perspective view of a facsimile machine showing one embodiment of the Ink delivery system in phantom outline.

As a result of these design options, the integral pressure regulator offers a wide range of product implementations other than those illustrated in FIGS. 1A and 1B. For example, such Ink delivery systems may be incorporated into an inkjet printer used in a facsimile machine 500 as shown in FIG. 20, where a scanning cartridge 502 and an off-axis Ink delivery system 504, connected via tube 506, are shown in phantom outline.

Figure 21:
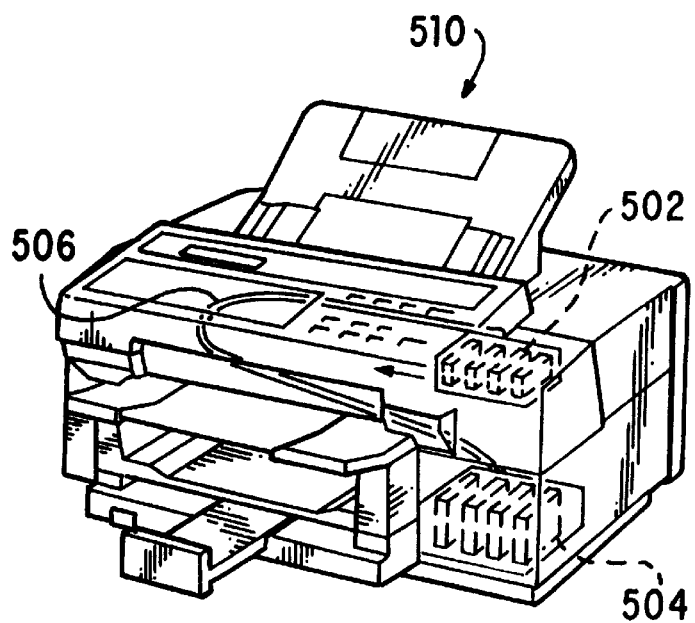
FIG. 21 is a perspective view of a copier, which may be a combined facsimile machine and printer, illustrating one embodiment of the Ink delivery system in phantom outline.

FIG. 21 illustrates a copying machine 510, which may also be a combined facsimile/copying machine, incorporating an Ink delivery system described herein. Scanning print cartridges 502 and an off-axis Ink supply 504, connected via tube 506, are shown in phantom outline.

Figure 22:
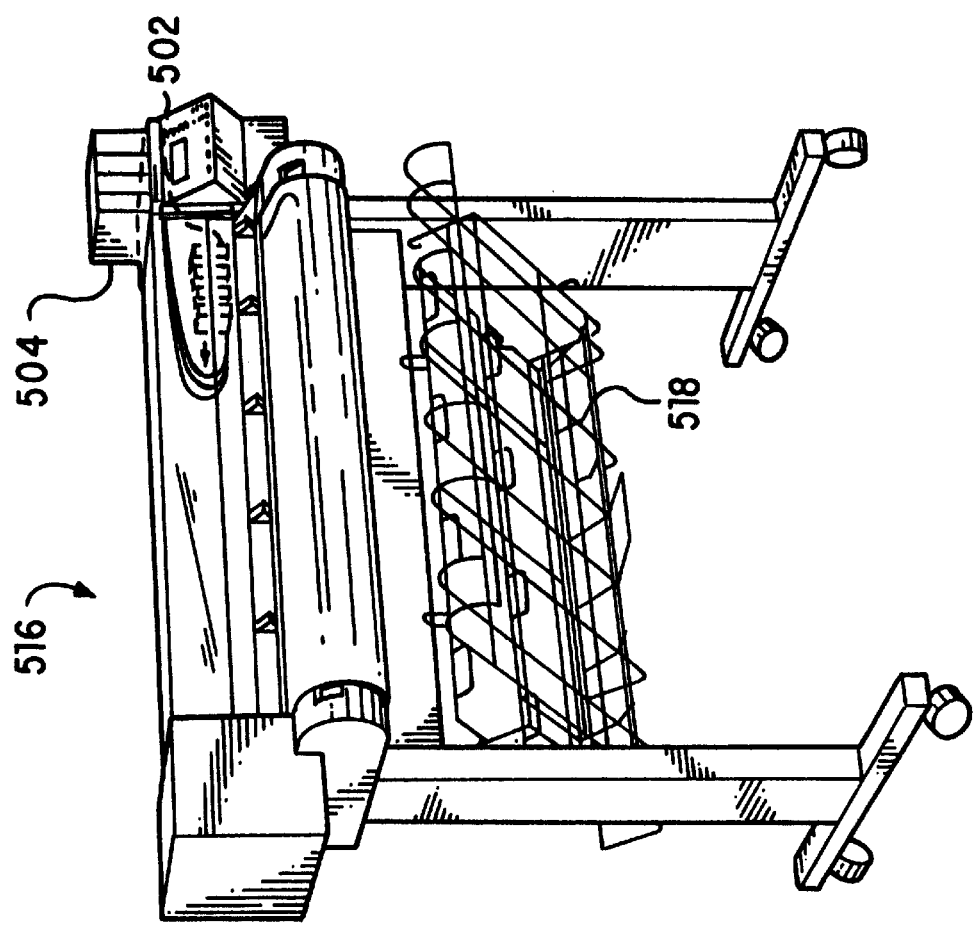
FIG. 22 is a perspective view of a large-format inkjet printer illustrating one embodiment of the Ink delivery system.

FIG. 22 illustrates a large-format printer 516 which prints on a wide, continuous paper roll supported by tray 518. Scanning print cartridges 502 are shown connected to the off-axis Ink supply 504 via tube 506.

Facsimile machines, copy machines, and large format machines tend to be shared with heavy use. They are often used unattended and for large numbers of copies. Thus, large capacity (50–500 cc) Ink supplies will tend to be preferred for these machines. In contrast, a home printer or portable printer would be best with low capacity supplies in order to minimize product size and cost. Thus, the product layouts shown in FIGS. 1A and 1B are most appropriate for such smaller form factor or lower cost applications.

While particular embodiments of the present invention have been shown and described, it will be obvious to those skilled in the art that changes and modifications may be made within departing from this invention in its broader aspects and, therefore, the appended claims are to encompass within their scope all such changes and modifications as fall within the true spirit and scope of this invention.

What is claimed is:

1. A fluidic coupling coupled to an inkjet print cartridge for an inkjet printing system, comprising:
   an ink supply;
   wherein the inkjet print cartridge includes nozzles for ejecting ink in a first direction defined by a droplet ejection direction and has an integral ink inlet port oriented to receive the ink in a second direction substantially opposite to the droplet ejection direction;
   wherein the fluidic coupling includes a body with an inner surface, an outer surface and first and second end portions defining an internal chamber, said internal chamber providing an internal fluid conduit for the ink between the first and second end portions of said body;

wherein the fluidic coupling further includes a first fluidic interconnect affixed to the first end portion of said body and in fluidic communication with said internal chamber, said first fluidic interconnect releasably sealed to the inlet port of the print cartridge when the body is engaged with the print cartridge by a substantially linear motion that is in the second direction substantially opposite to the droplet ejection direction, so that the internal fluid conduit and the inlet port of the print cartridge are in fluid communication so as to allow the ink to flow through the fluid conduit to the first fluidic coupling, through the first fluidic interconnect and into the inlet port of the print cartridge in the direction substantially opposite to the droplet ejection direction; and wherein the fluidic coupling further includes a second fluidic interconnect affixed to the second end portion of said body and in fluidic communication with said internal chamber, said second fluidic interconnect releasably sealed to an outlet port of the ink supply to allow fluid communication between the internal fluid conduit and the outlet port of the ink supply so as to allow the ink to flow from the ink supply through the second fluidic interconnect, and into the internal fluid conduit.

2. The fluidic coupling of claim 1, wherein the internal chamber further includes an ink reservoir.

3. The fluidic coupling of claim 2, wherein the ink reservoir includes foam for containing the ink.

4. The fluidic coupling of claim 2, wherein the ink reservoir includes a bladder for containing the ink.

5. The fluidic coupling of claim 2, wherein the ink reservoir includes a spring bag for containing the ink.

6. The fluidic coupling of claim 1, wherein the inlet port of the print cartridge is a hollow needle.

7. The fluidic coupling of claim 6, wherein the first fluidic interconnect comprises a resilient material to receive the hollow needle.

8. The fluidic coupling of claim 7, wherein the resilient material further includes a self sealing hole to receive the inlet needle.

9. The fluidic coupling of claim 1, wherein the second fluidic interconnect comprises a resilient material to receive a needle.

10. The fluidic coupling of claim 1, wherein the outer surface of the body engages an inner surface of a shroud substantially surrounding the inlet port, and having a mating tapered shape with the outer surface of the body so as to facilitate alignment between the first fluidic interconnect and the inlet port of the print cartridge.

11. The fluidic coupling of claim 1, wherein the ink flowing through the first fluidic interconnect defines a first direction and the ink flowing through the second fluidic interconnect defines a second direction such that the second direction forms an acute angle with the first direction.

12. The fluidic coupling of claim 11, wherein the acute angle is 90 degrees.

13. The fluidic coupling of claim 11, wherein the acute angle is 0 degrees.

14. A fluidic adapter for an inkjet printing system, comprising:

an inkjet print cartridge having nozzles for ejecting ink in a droplet ejection direction and having an integral ink inlet port oriented to receive ink in a direction substantially opposite to the droplet ejection direction;

a body having an inner surface, an outer surface and first and second end portions defining an internal chamber, said internal chamber providing an ink reservoir for the print cartridge; and a fluidic interconnect affixed to the first end of said body and in fluidic communication with said internal chamber, said fluidic interconnect releasably sealed to the inlet port of the print cartridge when the body is engaged with the print cartridge to allow fluid communication between the internal chamber and the inlet port of the print cartridge so as to allow ink to flow through the fluid interconnect and into the inlet port of the print cartridge in a direction substantially opposite to the ejection direction.

15. The fluidic adapter of claim 14, wherein the internal chamber protects the inlet port from drying leaking and air ingestion.

16. The fluidic adapter of claim 14, wherein the ink reservoir includes foam for containing the ink.

17. The fluidic adapter of claim 14, wherein the inlet port of the print cartridge is a hollow needle and wherein the first fluidic interconnect comprises a resilient material to receive the hollow needle.

18. A printing system, comprising:

a print cartridge having a printhead for ejecting ink in a first direction defined by a droplet ejection direction, the print cartridge having an integral ink inlet port oriented to receive ink in a second direction substantially opposite to the droplet ejection direction;

a scanning carriage for supporting and moving the print cartridge across a print zone;

a fluid interconnect fluidically coupled with the inlet port such that ink can flow from the fluid interconnect into the ink inlet port in the second direction that is substantially opposite to the droplet ejection direction, wherein fluidic coupling occurs simultaneously when the printhead is supported by the scanning carriage; and a fluid conduit that is in fluid communication with the fluid interconnect, the fluid conduit receives ink from an ink source.

19. The printing system of claim 18, wherein the ink source is removable from said printing system.

20. The printing system of claim 19, wherein the ink source is located on the scanning carriage and moves with the scanning carriage.

21. The printing system of claim 19, wherein the ink source, the fluid conduit, and the fluid interconnect are an integral removable unit.

22. The printing system of claim 18, wherein the ink source is located off the scanning carriage and the fluidic conduit includes a flexible member that establishes fluid communication between the ink source and the fluid interconnect.

23. The printing system of claim 18 wherein the ink inlet port is a hollow needle.

24. The printing system of claim 18 wherein the ink inlet comprises a resilient material.

25. The printing system of claim 18, wherein the print cartridge is removeably installed on the scanning carriage.

26. The printing system of claim 25, wherein the fluid interconnect is attached to the ink inlet port before the print cartridge is removeably installed in the scanning carriage.

27. The printing system of claim 25, wherein the fluid interconnect is attached to the ink inlet after the print cartridge is removeably installed in the scanning carriage.

28. A method of providing ink to an inkjet print cartridge, the method comprising:

providing an inkjet print cartridge for ejecting ink in a droplet ejection direction, the print cartridge having an integral fluid inlet oriented so that ink enters the fluid inlet in a direction substantially opposite to the droplet ejection direction;

inserting the print cartridge into a scanning carriage in a direction substantially parallel to the droplet ejection direction when the print cartridge is inserted in the scanning carriage, said print cartridge making simultaneous fluidic and electrical connection to the scanning carriage;

connecting a fluid interconnect to the fluid inlet in a substantially linear motion that is substantially opposite to the droplet ejection direction, the fluid interconnect in fluid communication with a fluid conduit, wherein fluidic coupling occurs simultaneously when the printhead is inserted into the scanning carriage; and transporting ink through the fluid conduit and to the fluid interconnect and through the fluid interconnect into the print cartridge in a direction substantially opposite to the droplet ejection direction.

* * * * *